United States Patent [19]

Carpenter et al.

[11] Patent Number: 5,214,715
[45] Date of Patent: May 25, 1993

[54] PREDICTIVE SELF-ORGANIZING NEURAL NETWORK

[75] Inventors: Gail A. Carpenter; Stephen Grossberg, both of Newton Highlands; John W. Reynolds, Brookline, all of Mass.

[73] Assignee: Trustees of Boston University, Boston, Mass.

[21] Appl. No.: 648,653

[22] Filed: Jan. 31, 1991

[51] Int. Cl.[5] .............................................. G06K 9/62
[52] U.S. Cl. ...................................... 382/15; 382/14; 395/23; 395/24
[58] Field of Search .................... 382/14, 15, 10, 21, 382/49; 395/21, 23, 24, 26; 307/201

[56] References Cited

U.S. PATENT DOCUMENTS

| | | | |
|---|---|---|---|
| 5,054,093 | 10/1991 | Cooper et al. | 382/14 |
| 5,058,180 | 10/1991 | Khan | 382/14 |
| 5,060,278 | 10/1991 | Fukemizu | 382/14 |
| 5,095,443 | 3/1992 | Watanabe | 395/24 |

FOREIGN PATENT DOCUMENTS

| | | | |
|---|---|---|---|
| 86/02553 | 11/1986 | PCT Int'l Appl. | 382/14 |
| 91/00261 | 1/1991 | World Int. Prop. O. | 382/14 |

OTHER PUBLICATIONS

Ryan, "The Resonance Correlation Network", IEEE Int'l Conf. on Neural Nets Jul. 1988.
"Art 3: Hierarchical Search Using Chemical Transmitters in Self-Organizing Pattern Recognition Architectures," Gail A. Carpenter et al., Neural Networks, in press, Mar. 1990.
Gail A. Carpenter, "Neural Network Models for Pattern Recognition and Associative Memory," Neural Networks, vol. 2, No. 4, 1989, New York, pp. 243-257.

Primary Examiner—Leo H. Boudreau
Assistant Examiner—Michael R. Cammarata
Attorney, Agent, or Firm—Hamilton, Brook, Smith & Reynolds

[57] ABSTRACT

An A pattern recognition subsystem responds to an A feature representation input to select A-category-representation and predict a B-category-representation and its associated B feature representation input. During learning trials, a predicted B-category-representation is compared to that obtained through a B pattern recognition subsystem. With mismatch, a vigilance parameter of the A-pattern-recognition subsystem is increased to cause reset of the first-category-representation selection. Inputs to the pattern recognition subsystems may be preprocessed to complement code the inputs.

26 Claims, 4 Drawing Sheets

PREDICTIVE SELF-ORGANIZING NEURAL NETWORK

GOVERNMENT SUPPORT

The United States Government has rights to the claimed invention under one or more of the following contracts:
BP (8-A-1204), DARPA (ASFOSR 90-0083), the National Science Foundation (NSF IRI-90-00539), Air Force Office of Scientific Research (AFOSR 90-0175 and AFOSR 90-0128), and the Army Research Office (ARO DAAL-03-88-K00880).

BACKGROUND OF THE INVENTION

Adaptive resonance architectures are neural networks that self-organize stable recognition categories in real time in response to arbitrary sequences of input patterns. The basic principles of adaptive resonance theory (ART) were introduced in Grossberg, "Adaptive pattern classification and universal recoding, II: Feedback, expectation, olfaction, and illusions." *Biological Cybernetics*, 23 (1976) 187–202. A class of adaptive resonance architectures has since been characterized as a system of ordinary differential equations by Carpenter and Grossberg, "Category learning and adaptive pattern recognition: A neural network model", *Proceedings of the Third Army Conference on Applied Mathematics and Computing*, ARO Report 86-1 (1985) 37–56, and "A massively parallel architecture for a self-organizing neural pattern recognition machine." *Computer Vision, Graphics, and Image Processing*, 37 (1987) 54–115. One implementation of an ART system is presented in U.S. application Ser. No. PCT/US86/02553, filed Nov. 26, 1986 by Carpenter and Grossberg for "Pattern Recognition System." A network known as ART 2 is presented in U.S. Pat. No. 4,914,708 to Carpenter and Grossberg. A further network known as ART 3 is presented in U.S. patent application Ser. No. 07/464,247 filed by Carpenter and Grossberg on Jan. 12, 1990.

As shown in FIG. 1, ART networks encode new input patterns received at 20, in part, by changing the weights or long term memory (LTM) traces of a bottom-up adaptive filter 22. This filter is contained in pathways leading from a feature representation field ($F_1$) to a category representation field ($F_2$) of short term memory. Generally, the short term memory (STM) fields hold new patterns relative to each input pattern. The long term memory (LTM), on the other hand, defines patterns learned from some number of input patterns, that is, over a relatively longer period of time. This bottom-up filtering property is shared by many other models of adaptive pattern recognition and associative learning. In an ART network, however, it is a second, top-down adaptive filter 24 that leads to the crucial property of code self-stabilization. The top-down filtered inputs to $F_1$ form a template pattern and enable the network to carry out attentional priming, pattern matching, and self-adjusting parallel search.

The fields $F_1$ and $F_2$, as well as the bottom-up and top-down adaptive filters, are contained within the ART's attentional subsystem. An auxiliary orienting subsystem 26 becomes active when a bottom-up input to $F_1$ fails to match the learned top-down template from filter 24 corresponding to the active category representation at $F_2$. In this case, the orienting subsystem rapidly resets the active category representation. This reset automatically induces the attentional subsystem to proceed with a parallel search. Alternative categories are tested until either an adequate match is found or a new category is established. The search remains efficient because the search strategy through filter 22 is adaptively updated throughout the learning process. The search proceeds rapidly relative to the learning rate. Thus significant changes in the bottom-up and top-down adaptive filters occur only when a search ends and a matched $F_1$ pattern resonates within the system. The system carries out a search during many initial input trials. Thereafter, however, the search mechanism is automatically disengaged, with each input having direct access to its category representation.

In principle, any new input could create a new category at any time: plasticity, or the potential for change in the LTM, remains intact indefinitely. If at any time, for example, a new input were added to the previously learned set, the system would search the established categories. If an adequate match were found, the LTM category representation would be refined, if necessary, to incorporate the new pattern. If no match were found, a new category would be formed, with previously uncommitted LTM traces encoding the STM pattern established by the input. Nevertheless, the code does tend to stabilize as the category structure becomes increasingly complex, since then each new pattern becomes increasingly likely to fit into an established category.

The criterion for an adequate match between an input pattern and a chosen category template is adjustable. The matching criterion is determined by a vigilance parameter that controls activation of the orienting subsystem 26. All other things being equal, higher vigilance imposes a stricter matching criterion, which in turn partitions the input set into finer categories. Lower vigilance tolerates greater top-down/bottom-up mismatches at $F_1$, leading in turn to coarser categories. In addition, at every vigilance level, the matching criterion is self-scaling: a small mismatch may be tolerated if the input pattern is complex, while the same featural mismatch would trigger reset if the input represented only a few features.

The orienting subsystem is one of the means by which an ART network carries out active regulation of the learning process. Attentional gain control 28 and 30 at $F_1$ and $F_2$ also contributes to this active regulation. Gain control acts to adjust overall sensitivity to patterned inputs and to coordinate the separate, synchronous functions of the ART system.

SUMMARY OF THE INVENTION

The present invention allows for the association of a first feature representation input pattern, such as the visual representation of an object, with a predicted consequence, such as taste. In the system disclosed and claimed, a first pattern recognition subsystem is associated with the first feature representation and a second subsystem is associated with the predicted consequence. However, to avoid confusion with first and second patterns in time, the first and second subsystems and their components and patterns are identified by the letters A and B (and a and b) rather than the terms first and second.

In accordance with the present invention, an A-category-representation is selected by a pattern recognition subsystem, such as an ART system, from a feature representation. The A-category-representation is associated with a predicted B-category-representation. With an insufficient match between a predicted B-category-representation and a control B-category-representation, the A pattern recognition subsystem is reset to select a different A-category-representation. Preferably, the control B-category-representation is defined from a B feature representation by a B pattern recognition system such as a B ART system. The predicted B-category-representation may then predict the second feature representation.

In accordance with particular features of the present invention, the A pattern recognition system comprises a feature representation field ($F_1$) which receives input signals, defining an input pattern, and template signals. An A-category-representation in an A-category-representation field ($F_2$) is selected based on a pattern from the feature representation field. Template signals are generated based on the selected A-category-representation. With a sufficient match between the template signals and the input signals, the A-category-representation selection and the template signals are adapted to the input signals. However, with an insufficient match the A-category-representation selection is reset. Preferably, a like pattern recognition subsystem responsive to a different set of input patterns defines the control B-category-representation.

Reset of the A-category-representation may be initially based on a first level of matching vigilance, and that matching vigilance may be increased with mismatch of the predicted and control B-category-representations. The vigilance is increased to cause reset of the A-category-representation selection, and the increased vigilance is maintained with subsequent selection of an A-category-representation as the input is maintained to the feature representation field. By raising the vigilance to a minimum level required to reset the A-category-representation, persistent errors are avoided while generalization of categories is maximized.

Preferably, predicted B-category-representations and control B-category-representations are associated through a mapping field. A one-to-one correspondence is maintained between nodes of the mapping field and nodes of a B-category-representation field. Adaptive mapping is maintained from nodes of the A-category-representation field to nodes of the mapping field. The predicted B category representation associated with the selected A category representation may be learned as the control B category representation selected by the B pattern recognition subsystem. In operation, one or both of the pattern recognition systems may receive an input and either input may precede the other. Where an A input pattern is received before a B input pattern, the predicted B-category-representation associated with the selected A-category-representation may prime the B pattern recognition subsystem. The B subsystem would then initially select the predicted B-category-representation as the control B-category-representation, subject to reset with mismatch in the B feature representation field.

In general operation, A and B inputs may be applied to respective pattern recognition subsystems. Each subsystem allows for searching, selection and learning of a category representation. However, learning in the A subsystem is inhibited by reset with mismatch between a B-category-representation predicted by the A subsystem and the actual B-category-representation determined by the B subsystem. With reset of the A subsystem, it again searches and selects. A subsystem learning is allowed only after a match is obtained at the present level of vigilance within the A subsystem and a match is obtained between the subsystems.

Preferably, input signals to the feature representation fields comprise vectors of feature representations and complements of the feature representations.

More specifically, a new neural network architecture, called ARTMAP, autonomously learns to classify arbitrarily many, arbitrarily ordered vectors into recognition categories based on predictive success. This supervised learning system is built up from a pair of Adaptive Resonance Theory modules ($ART_a$ and $ART_b$) that are capable of self-organizing stable recognition categories in response to arbitrary sequences of input patterns. During training trials, the $ART_a$ module receives a stream $\{a^{(p)}\}$ of input patterns, and $ART_b$ receives a stream $\{b^{(p)}\}$ of input patterns, where $b^{(p)}$ is the correct prediction given $a^{(p)}$. These ART modules are linked by an associative learning network and an internal controller that ensures autonomous system operation in real time. During test trials, the remaining patterns $a^{(p)}$ are presented without $b^{(p)}$, and their predictions at $ART_b$ are compared with $b^{(p)}$. Tested on a benchmark machine learning database in both on-line and off-line simulations, the ARTMAP system learns orders of magnitude more quickly, efficiently, and accurately than alternative algorithms, and achieves 100% accuracy after training on less than half the input patterns in the database. It achieves these properties by using an internal controller that conjointly maximizes predictive generalization and minimizes predictive error by linking predictive success to category size on a trial-by-trial basis, using only local operations. This computation increases the vigilance parameter $\rho_a$ of $ART_a$ by the minimal amount needed to correct a predictive error at $ART_b$. Parameter $\rho_a$ calibrates the minimum confidence that $ART_a$ must have in a category, or hypothesis, activated by an input $a^{(p)}$ in order for $ART_a$ to accept that category, rather than search for a better one through an automatically controlled process of hypothesis testing. Parameter $\rho_a$ is compared with the degree of match between $a^{(p)}$ and the top-down learned expectation, or prototype, that is read-out subsequent to activation of an $ART_a$ category. Search occurs if the degree of match is less than $\rho_a$. ARTMAP is hereby a type of self-organizing expert system that calibrates the selectivity of its hypotheses based upon predictive success. As a result, rare but important events can be quickly and sharply distinguished even if they are similar to frequent events with different consequences. Between input trials $\rho_a$ relaxes to a baseline vigilance $\bar{\rho}_a$. When $\bar{\rho}_a$ is large, the system runs in a conservative mode, wherein predictions are made only if the system is confident of the outcome. Very few false-alarm errors then occur at any stage of learning, yet the system reaches asymptote with no loss of speed. Because ARTMAP learning is self-stabilizing, it can continue learning one or more databases, without degrading its corpus of memories, until its full memory capacity is utilized.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
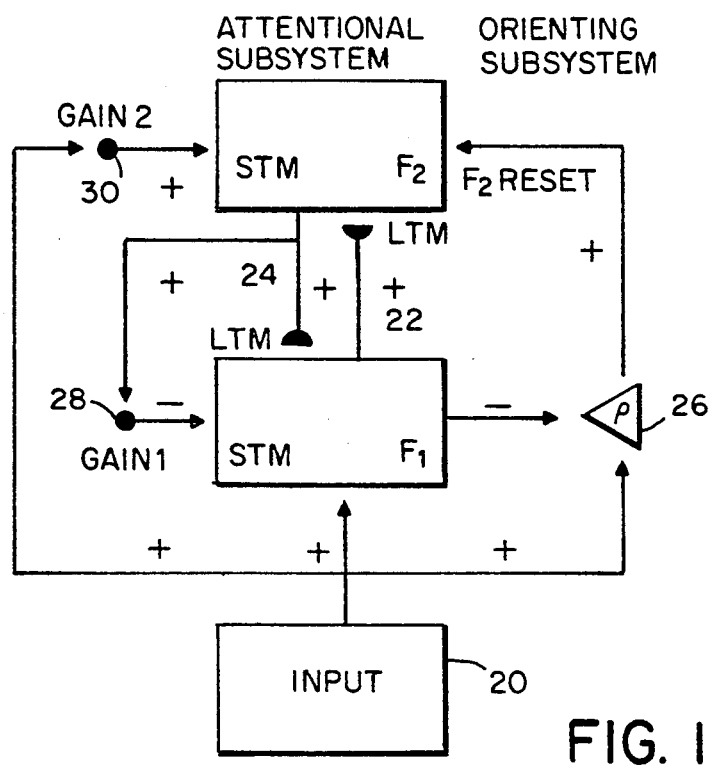
FIG. 1 is a block diagram of a conventional ART system.

As we move freely through the world, we can attend to both familiar and novel objects, and can rapidly learn to recognize, test hypotheses about, and learn to name novel objects without unselectively disrupting our memories of familiar objects. A new self-organizing neural network architecture—called a predictive ART or ARTMAP architecture—is capable of fast, yet stable, on-line recognition learning, hypothesis testing, and adaptive naming in response to an arbitrary stream of input patterns.

The possibility of stable learning in response to an arbitrary stream of inputs is required by an autonomous learning agent that needs to cope with unexpected events in an uncontrolled environment. One cannot restrict the agent's ability to process input sequences if one cannot predict the environment in which the agent must function successfully. The ability of humans to vividly remember exciting adventure movies is a familiar example of fast learning in an unfamiliar environment.

A successful autonomous agent must be able to learn about rare events that have important consequences, even if these rare events are similar to frequent events with very different consequences. Survival may hereby depend on fast learning in a nonstationary environment. Many learning schemes are, in contrast, slow learning models that average over individual event occurrences and are degraded by learning instabilities in a nonstationary environment.

An efficient recognition system needs to be capable of many-to-one learning. For example, each of the different exemplars of the font for a prescribed letter may generate a single compressed representation that serves as a visual recognition category. This exemplar-to-category transformation is a case of many-to-one learning. In addition, many different fonts—including lower case and upper case printed fonts and scripts of various kinds—can all lead to the same verbal name for the letter. This is a second sense in which learning may be many-to-one.

Learning may also be one-to-many, so that a single object can generate many different predictions or names. For example, upon looking at a banana, one may classify it as an oblong object, a fruit, a banana, a yellow banana, and so on. A flexible knowledge system may thus need to represent in its memory many predictions for each object, and to make the best prediction for each different context in which the object is embedded.

Why does not an autonomous recognition system get trapped into learning only that interpretation of an object which is most salient given the system's initial biases? One factor is the ability of that system to reorganize its recognition, hypothesis testing, and naming operations based upon its predictive success or failure. For example, a person may learn a visual recognition category based upon seeing bananas of various colors and associate that category with a certain taste. Due to the variability of color features compared with those of visual form, this learned recognition category may incorporate form features more strongly than color features. However, the color green may suddenly, and unexpectedly, become an important differential predictor of a banana's taste.

The different taste of a green banana triggers hypothesis testing that shifts the focus of visual attention to give greater weight, or salience, to the banana's color features without negating the importance of the other features that define a banana's form. A new visual recognition category can hereby form for green bananas, and this category can be used to accurately predict the different taste of green bananas. The new, finer category can form, moreover, without recoding either the previously learned generic representation of bananas or their taste association.

Future representations may also form that incorporate new knowledge about bananas, without disrupting the representations that are used to predict their different tastes. In this way, predictive feedback provides one means whereby one-to-many recognition and prediction codes can form through time, by using hypothesis testing and attention shifts that support new recognition learning without forcing unselective forgetting of previous knowledge.

The architecture described herein forms part of Adaptive Resonance Theory, or ART, which was introduced in 1976[3,4] in order to analyze how brain networks can autonomously learn in real time about a changing world in a rapid but stable fashion. Since that time, ART has steadily developed as physical theory to explain and predict ever larger data bases about cognitive information processing and its neural substrates[5-8]. A parallel development has described a series of rigorously characterized neural architectures—called ART 1, ART 2, and ART 3 —with increasingly powerful learning, pattern recognition, and hypothesis testing capabilities[1,9-11].

Figure 2:
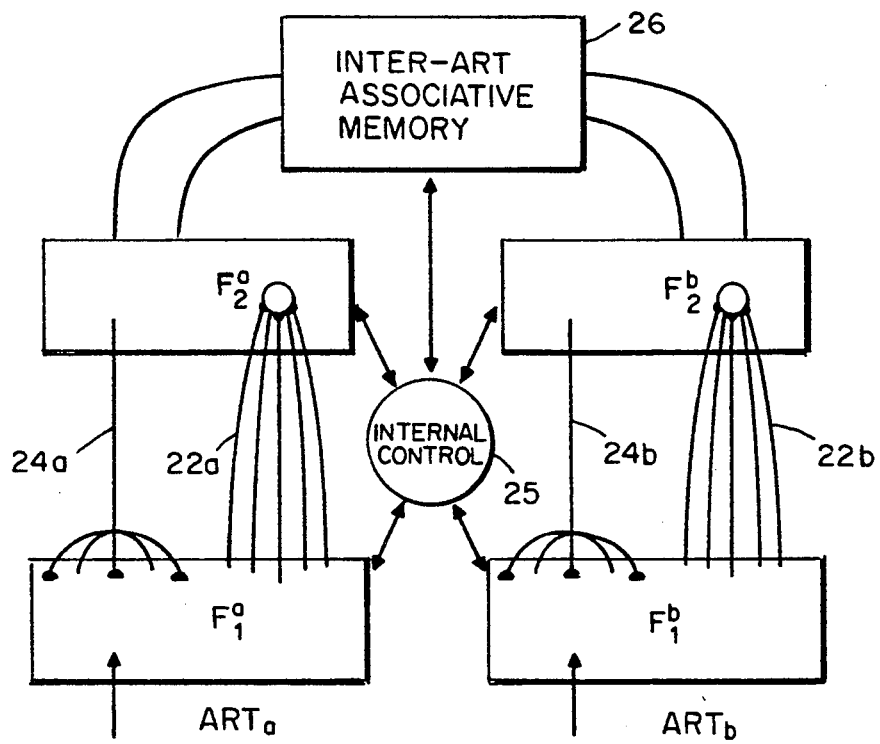
FIG. 2 is a block diagram of a system embodying the present invention.

The present class of architectures are called Predictive ART architectures because they incorporate ART modules into systems that can learn to predict a prescribed m-dimensional output vector b given a prescribed n-dimensional input vector a (FIG. 2). The present example of Predictive ART is called ARTMAP because its transformation from vectors in $\Re^n$ to vectors in $\Re^m$ defines a map that is learned by example from the correlated pairs $\{a^{(p)}, b^{(p)}\}$ of sequentially presented vectors, p=1, 2, . . . [12]. For example, the vectors $a^{(p)}$ may encode visual representations of objects, and the vectors $b^{(p)}$ may encode their predictive consequences, such as different tastes in the banana example above. The degree of code compression in memory is an index of the system's ability to generalize from examples.

ARTMAP is a supervised learning system. With supervised learning, an input vector $a^{(p)}$ is associated with another input vector $b^{(p)}$ on each training trial. On a test trial, a new input a is presented that has never been experienced before. This input predicts an output vector b. System performance is evaluated by comparing b with the correct answer. This property of generalization is the system's ability to correctly predict answers to a test set of novel inputs a.

An overview of the system is presented in FIG. 2. It includes two ART modules $ART_a$ and $ART_b$. Each module includes the usual feature representation short term memory field $F_1$ and category representation short term memory field $F_2$. Thus, $ART_a$ includes short term fields $F_1^a$ and $F_2^a$, while $ART_b$ includes short term memory fields $F_1^b$ and $F_2^b$. Thus, a pattern represented by the Vector a selects, through a long term memory adaptive filter 22a, a category representation in field $F_2^a$. That category representation may itself be a pattern within $F_2^a$, but typically a single category is chosen. In the adaptive filter 22a, each element of the vector in $F_1^a$ is weighted toward each category node of $F_2^a$. However, for clarification only a few weighted connections 22a of the bottom-up adaptive filter are illustrated. A template from the selected category which defines an expected pattern is generated by a top-down adaptive filter 24a. Top-down weights are provided from all nodes of $F_2^a$ to all nodes of $F_1^a$ but for clarification only a few weighted connections 24a are illustrated.

As in a conventional ART system, the top-down template is compared with the input vector a in $F_1^a$ against a vigilance parameter. If the match is sufficient, as determined by an internal control system 24, the initial selection is maintained. If the match is insufficient, the previously selected category is no longer considered and another category is selected by the bottom-up adaptive filter. In this respect, $ART_a$ is conventional.

In accordance with the present invention, $ART_a$ is associated with another ART module $ART_b$. $ART_b$ operates in the same fashion as $ART_a$ but receives different inputs. For example, $ART_a$ may receive a visual representation vector while $ART_b$ receives a taste representation vector. The internal control systems of the two ART systems are linked by control system 25 in a manner described below. The categories which are selected by the $ART_a$ and $ART_b$ modules from associated inputs a and b are associated in an associative memory 26. Operation of this memory as a map field is described below.

The ARTMAP system is designed to conjointly maximize generalization and minimize predictive error under fast learning conditions in real time in response to an arbitrary ordering of input patterns. Remarkably, the network can achieve 100% test set accuracy on the machine learning benchmark database described below. Each ARTMAP system learns to make accurate predictions quickly, in the sense of using relatively little computer time; efficiently, in the sense of using relatively few training trials; and flexibly, in the sense that its stable learning permits continuous new learning, on one or more databases, without eroding prior knowledge, until the full memory capacity of the network is exhausted. In an ARTMAP network, the memory capacity is chosen arbitrarily large without sacrificing the stability of fast learning or accurate generalization.

An essential feature of the ARTMAP design is its ability to conjointly maximize generalization and minimize predictive error on a trial-by-trial basis using only local operations. It is this property which enables the system to learn rapidly about rare events that have important consequences even if they are very similar to frequent events with different consequences. The property builds upon a key design feature of all ART systems; namely, the existence of an orienting subsystem that responds to the unexpectedness, or novelty, of an input exemplar a by driving a hypothesis testing cycle, or parallel memory search, for a better, or totally new, recognition category for a. Hypothesis testing is triggered by the orienting subsystem if a activates a recognition category that reads out a learned expectation, or prototype, which does not match a well enough. The degree of match provides an analog measure of the predictive confidence that the chosen recognition category represents a, or of the novelty of a with respect to the hypothesis that is symbolically represented by the recognition category. This analog match value is computed at the orienting subsystem where it is compared with a dimensionless parameter that is called vigilance. A cycle of hypothesis testing is triggered if the degree of match is less than vigilance. Conjoint maximization of generalization and minimization of predictive error is achieved on a trial-by-trial basis by increasing the vigilance parameter in response to a predictive error on a training trial. The minimum change is made that is consistent with correction of the error. In fact, the predictive error causes the vigilance to increase rapidly until it just exceeds the analog match value, in a process called match tracking.

Before each new input arrives, vigilance relaxes to a baseline vigilance value. Setting baseline vigilance to 0 maximizes code compression. The system accomplishes this by allowing an "educated guess" on every trial, even if the match between input and learned code is poor. Search ensues, and a new category is established, only if the prediction made in this forced-choice situation proves wrong. When predictive error carries a cost, however, baseline vigilance can be set at some higher value, thereby decreasing the "false alarm" rate. With positive baseline vigilance, the system responds "I don't know" to an input that fails to meet the minimum matching criterion. Predictive error rate can hereby be made very small, but with a reduction in code compression. Search ends when the internal control system 24 determines that a global consensus has been reached.

ARTMAP achieves its combination of desirable properties by acting as a type of self-organizing expert system. It incorporates the basic properties of all ART systems to carry out autonomous hypothesis testing and parallel memory search for appropriate recognition codes. Hypothesis testing terminates in a sustained state of resonance that persists as long as an input remains approximately constant. The resonance generates a focus of attention that selects the bundle of critical features common to the bottom-up input and the top-down expectation, or prototype, that is read-out by the resonating recognition category. Learning of the critical feature pattern occurs in this resonant and attentive state, hence the term adaptive resonance.

The resonant focus of attention is a consequence of a matching rule called the ⅔ Rule[9]. This rule clarifies how a bottom-up input pattern can supraliminally activate its feature detectors at the level $F_1$ of an ART network, yet a top-down expectation can only subliminally sensitize, or prime, the level $F_1$. Supraliminal activation means that $F_1$ can automatically generate output signals that initiate further processing of the input. Subliminal activation means that $F_1$ cannot generate output signals that initiate further processing of the input. Subliminal activation means that $F_1$ cannot generate output signals, but its primed cells can more easily be activated by bottom-up inputs. For example, the verbal command "Look for the yellow banana" can prime visual feature detectors to respond more sensitively to visual inputs that represent a yellow banana, without forcing these cells to be fully activated, which would have caused a visual hallucination.

Carpenter and Grossberg[6] have shown that the $\frac{2}{3}$ Rule is realized by a kind of analog spatial logic. This logical operation computes the spatial intersection of bottom-up and top-down information. The spatial intersection is the focus of attention. It is of interest that subliminal top-down priming, which instantiates a type of "intentionality" in an ART system implies a type of matching law, which instatiates a type of "logic." Searle[17] and others have criticized some AI models because they sacrifice intentionality for logic. In ART, intentionality implies logic.

As discussed above, the main elements of an ART-MAP system are shown in FIG. 2. Two modules, $ART_a$ and $ART_b$ read vector inputs a and b. If $ART_a$ and $ART_b$ were disconnected, each module would self-organize category groupings for the separate input sets. In the application described below, $ART_a$ and $ART_b$ are fast-learn ART 1 modules coding binary input vectors. $ART_a$ and $ART_b$ are here connected by an inter-ART module that in many ways resembles ART 1. This inter-ART module includes a Map Field 26 that controls the learning of an associative map from $ART_a$ recognition categories to $ART_b$ recognition categories. This map does not directly associate exemplars a and b, but rather associates the compressed and symbolic representations of families of exemplars a and b. The Map Field also controls match tracking of the $ART_a$ vigilance parameter. A mismatch at the Map Field between the $ART_a$ category activated by an input a and the $ART_b$ category activated by the input b increases $ART_a$ vigilance by the minimum amount needed for the system to search for and, if necessary, learn a new $ART_a$ category whose prediction matches the $ART_b$ category.

This inter-ART vigilance resetting signal is a form of "back propagation" of information, but one that differs from the back propagation that occurs in the Back Propagation network. For example, the search initiated by the inter-ART reset can shift attention to a novel cluster of visual features that can be incorporated through learning into a new $ART_a$ recognition category. This process is analogous to learning a category for "green bananas" based on "taste" feedback. However, these events do not "back propagate" taste features into the visual representation of the bananas, as can occur using the Back Propagation network. Rather, match tracking reorganizes the way in which visual features are grouped, attended, learned, and recognized for purposes of predicting an expected taste.

ART modules $ART_a$ and $ART_b$

Each ART module in FIG. 2 establishes compressed recognition codes in response to sequences of input patterns a and b. Associative learning at the Map Field 26 links pairs of pattern classes via these compressed codes. One type of generalization follows immediately from this learning strategy: If one vector a is associated with a vector b, then any other input that activates a's category node will predict the category of pattern b. Any ART module can be used to self-organize the $ART_a$ and $ART_b$ categories. In the poison mushroom application below, a and b are binary vectors, so $ART_a$ and $ART_b$ can be ART 1 modules. The main computations of the ART 1 module will here be outlined. A full definition of ART 1 modules, as systems of differential equations, along with an analysis of their network dynamics, can be found in Carpenter and Grossberg[9]. For other applications ART 2 and ART 3 modules may be more appropriate.

In an ART 1 module, an input pattern I is represented in field $F_1$ and the recognition category for I is represented in field $F_2$. We consider the case where the competitive field $F_2$ makes a choice and where the system is operating in a fast-learn mode, as defined below. An algorithm for simulations is given below.

Figure 3:
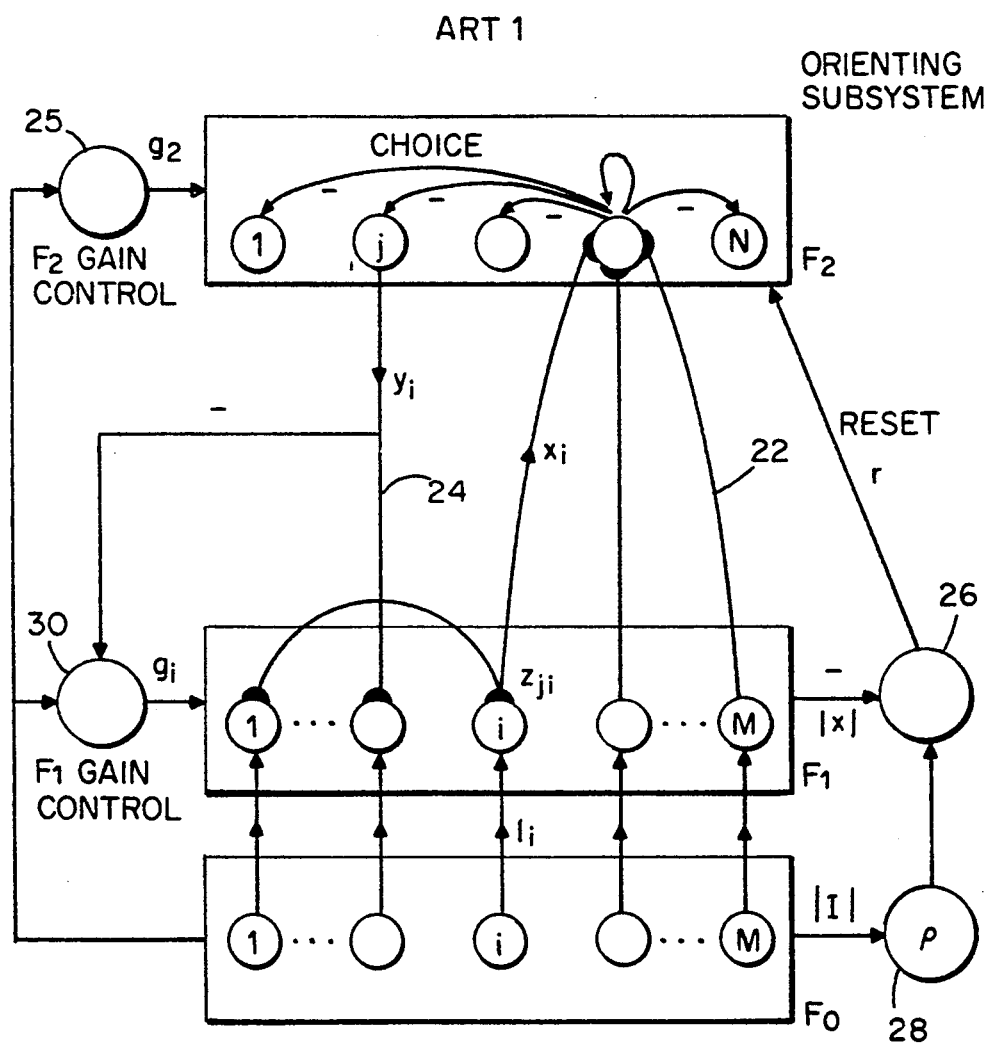
FIG. 3 is a detailed schematic illustration which can be applied to each of the $ART_a$ and $ART_b$ modules of FIG. 2.

FIG. 3 illustrates the main components of an ART 1 module. The binary vector I forms the bottom-up input to the field $F_1$ whose activity vector is denoted x. The competitive field $F_2$ is designed to make a choice. Adaptive pathways 22 lead from each $F_1$ node to all $F_2$ nodes, and pathways 24 lead from each $F_2$ node to all $F_1$ nodes. Only sample pathways are shown. Reset occurs when the match between x and I fails to meet the criterion established by the vigilance parameter $\rho$. All paths are excitatory unless marked with a minus sign. A field of M nodes $F_1$ with output vector $x \equiv (x_1, \ldots, x_M)$ registers the $F_0 \rightarrow F_1$ input vector $I \equiv (I_1, \ldots, I_M)$. Each $F_1$ node can receive input from three sources: the $F_0 \rightarrow F_1$ bottom-up input; nonspecific gain controls 25 and 30; and top-down signals 24 from the N nodes of $F_2$, via an $F_2 \rightarrow F_1$ adaptive filter. A node is said to be active if it generates an output signal equal to 1. Output from inactive nodes equals 0. In ART 1 an $F_1$ node is active if at least 2 of the 3 input signals are large. This rule for $F_1$ activation is called the $\frac{2}{3}$ Rule. The $\frac{2}{3}$ Rule is realized in its simplest, dimensionless form as follows.

The ith $F_1$ node is active if its net input exceeds a fixed threshold. Specifically, $$x_i = \begin{cases} 1 & \text{if } I_i + g_1 + \sum_{j=1}^{N} y_j z_{ji} > 1 + z \\ 0 & \text{otherwise,} \end{cases} \quad (1)$$

where term $I_i$ is the binary $F_0 \rightarrow F_1$ input, term $g_1$ is the binary nonspecific $F_1$ gain control signal, term $\Sigma y_j z_{ji}$ is the sum of $F_2 \rightarrow F_1$ signals $y_j$ via pathways with adaptive weights $z_{ji}$ and z is a constant such that $$0 < z < 1. \quad (2)$$

The signal $g_1$ from the $F_1$ gain control 30 is defined by $$g_1 = \begin{cases} 1 & \text{if } F_0 \text{ is active and } F_2 \text{ is inactive} \\ 0 & \text{otherwise.} \end{cases} \quad (3)$$

Note that $F_2$ activity inhibits $F_1$ gain, as shown in FIG. 3. These laws for $F_1$ activation imply that, if $F_2$ is inactive, $$x_i = \begin{cases} 1 & \text{if } I_i = 1 \\ 0 & \text{otherwise.} \end{cases} \quad (4)$$

If exactly one $F_2$ node J is active, the sum $\Sigma y_j z_{ji}$ in (1) reduces to the single term $z_{Ji}$, so $$x_i = \begin{cases} 1 & \text{if } I_i = 1 \text{ and } z_{Ji} > z \\ 0 & \text{otherwise.} \end{cases} \quad (5)$$

Let $T_j$ denote the total input from $F_1$ to jth $F_2$ node, given by $$T_j = \sum_{i=1}^{M} x_i z_{ij}, \quad (6)$$

where the $Z_{ij}$ denote the $F_1 \rightarrow F_2$ adaptive weights. If some $T_j > 0$, define the $F_2$ choice index J by $$T_J = \max\{T_j : j = 1 \ldots N\}. \quad (7)$$

In the typical case, J is uniquely defined. Then the $F_2$ output vector $y = (y_1, \ldots, y_N)$ obeys $$y_j = \begin{cases} 1 & \text{if } j = J \\ 0 & \text{if } j \neq J. \end{cases} \quad (8)$$

If two or more indices j share maximal input, then they equally share the total activity. This case is not considered here.

In fast-learn ART 1, adaptive weights reach their new asymptote on each input presentation. The learning laws, as well as the rules for choice and search, are conveniently described using the following notation. If a is a binary M-vector, define the norm of a by $$|a| \equiv \sum_{i=1}^{M} a_i. \quad (9)$$

If a and b are two binary vectors, define a third binary vector by $\cap$ b by $$(a \cap b)_i \equiv 1 \Leftrightarrow a_i = 1 \text{ and } b_i = 1. \quad (10)$$

Finally, let a be a subset of b (a b) if $a \cap b = a$.

All ART 1 learning is gated by $F_2$ activity; that is, the adaptive weights $z_{Ji}$ and $Z_{iJ}$ can change only when the Jth $F_2$ node is active. Then both $F_2 \rightarrow F_1$ and $F_1 \rightarrow F_2$ weights are functions of the $F_1$ vector x, as follows.

Top-down $F_2 \rightarrow F_1$ weights in active paths learn x; that is, when the Jth $F_2$ node is active $$z_{Ji} \rightarrow x_i. \quad (11)$$

All other $Z_{ji}$ remain unchanged. Stated as a differential equation, this learning rule is $$\frac{d}{dt} z_{ji} = y_j(x_i - z_{ji}). \quad (12)$$

In (12), learning by $Z_{ji}$ is gated by $y_j$. When the $y_j$ gate opens—that is, when $y_j > 0$—then learning begins and $Z_{ji}$ is attracted to $X_i$. In vector terms, if $y_j > 0$, then $Z_j \equiv (Z_{j1}, Z_{j2}, \ldots, Z_{jM})$ approaches x. Such a law is therefore sometimes called learning by gated steepest descent. It is also called the outstar learning rule, and was introduced into the neural modelling literature in 1969[23].

Initially all $Z_{ji}$ are maximal:

$$Z_{ji}(0) = 1. \quad (13)$$

Thus with fast learning, the top-down weight vector $Z_j$ is a binary vector at the start and end of each input presentation. By (4), (5), (10), (11), and (13), the $F_1$ activity vector can be described as $$x = \begin{cases} I & \text{if } F_2 \text{ is inactive} \\ I \cap z_J & \text{if the Jth } F_2 \text{ node is active.} \end{cases} \quad (14)$$

By (5) and (12), when node J is active, learning causes $$z_J \rightarrow I \cap z_J^{(old)} \quad (15)$$

where $Z_J^{(old)}$ denotes $Z_J$ at the start of the input presentation. By (11) and (14), x remains constant during learning, even though $|Z_j|$ may decrease.

The first time an $F_2$ node J becomes active, it is said to be uncommitted. Then, by (13)–(15), $$z_J \rightarrow I \quad (16)$$

during learning. Thereafter node J is said to be committed.

In simulations it is convenient to assign initial values to the bottom-up $F_1 \rightarrow F_2$ adaptive weights $Z_{ij}$ in such a way that $F_2$ nodes first become active in the order $j = 1, 2, \ldots$. This can be accomplished by letting $$Z_{ij}(0) = a_j \quad (17)$$

where $$a_1 > a_2 \ldots > a_N. \quad (18)$$

Like the top-down weight vector $Z_J$, the bottom-up $F_1 \rightarrow F_2$ weight vector $Z_J \equiv (Z_{1J} \ldots Z_{iJ} \ldots Z_{MJ})$ also becomes proportional to the $F_1$ output vector x when the $F_2$ node J is active. In addition, however, the bottom-up weights are scaled inversely to $|x|$, so that $$z_{iJ} \rightarrow \frac{x_i}{\beta + |x|}, \quad (19)$$

where $\beta > 0$. This $F_1 \rightarrow F_2$ learning law, called the Weber Law Rule[9], realizes a type of competition among the weights $Z_J$ adjacent to a given $F_2$ node J. This competitive computation could alternatively be transferred to the $F_1$ field, as it is in ART 2. By (14), (15), and (19), during learning $$z_J \rightarrow \frac{I \cap z_J^{(old)}}{\beta + |I \cap z_J^{(old)}|}. \quad (20)$$

The $Z_{ij}$ initial values are required to be small enough so that an input I that perfectly matches a previously learned vector $Z_J$ will select the $F_2$ node J rather than an uncommitted node. This is accomplished by assuming that $$0 < a_j = Z_{ij}(0) < \frac{1}{\beta + |I|} \quad (21)$$

for all $F_0 \rightarrow F_1$ inputs I. When I is first presented, $x = I$, so by (6), (15), (17), and (20), the $F_1 \rightarrow F_2$ input vector $T \equiv (T_1, T_2, \ldots, T_N)$ is given by $$T_j = \sum_{i=1}^{M} I_i Z_{ij} = \tag{22}$$

$$\begin{cases} |I|\alpha_j & \text{if } j \text{ is an uncommitted node} \\ |I \cap z_j|/(\beta + |z_j|) & \text{if } j \text{ is a committed node.} \end{cases}$$

In the simulations below, $\beta$ is taken to be so small that, among committed nodes, $T_j$ is determined by the size of $|I \cap z_j|$ relative to $|z_j|$. If $\beta$ were large, $T_j$ would depend primarily on $|I \cap z_j|$. In addition, $\alpha_j$ values are taken to be so small that an uncommitted node will generate the maximum $T_j$ value in (22) only if $|I \cap z_j| = 0$ for all committed nodes. Larger values of $\alpha_j$ and $\beta$ bias the system toward earlier selection of uncommitted nodes when only poor matches are to be found among the committed nodes. A more complete discussion of this aspect of ART 1 system design is given by Carpenter and Grossberg[9].

By (7), (21), and (22), a committed $F_2$ node J may be chosen even if the match between I and $z_j$ is poor; the match need only be the best one available. If the match is too poor, then the ART 1 system can autonomously carry out hypothesis testing, or search, for a better $F_2$ recognition code. This search process is mediated by the orienting subsystem, which can reset $F_2$ nodes in response to poor matches at $F_1$ (FIG. 3). The orienting subsystem is a type of novelty detector that measures system confidence. If the degree of match between bottom-up input I and top-down weight vector $z_j$ is too poor, the system's confidence in the recognition code labelled by J is inadequate. Otherwise expressed, the input I is too unexpected relative to the top-down vector $z_j$, which plays the role of a learned top-down expectation.

An unexpected input triggers a novelty burst at the orienting subsystem, which sends a nonspecific reset wave r from the orienting subsystem to $F_2$. The reset wave enduringly shuts off node j so long as input I remains on. With J off and its top-down $F_2 \rightarrow F_1$ signals silent, $F_1$ can again instate vector $x = I$, which leads to selection of another $F_2$ node through the bottom-up $F_2 \rightarrow F_1$ adaptive filter. This hypothesis testing process leads to activation of a sequence of $F_2$ nodes until one is chosen whose vector of adaptive weights forms an adequate match with I, or until an uncommitted node is selected. The search takes place so rapidly that essentially no learning occurs on that time scale. Learned weights are hereby buffered against recoding by poorly matched inputs that activate unacceptable $F_2$ recognition codes. Thus, during search, previously learned weights actively control the search for a better recognition code without being changed by the signals that they process.

As noted above, the degree of match between bottom-up input I and top-down expectation $z_j$ is evaluated at the orienting subsystem, which measures system confidence that category J adequately represents input I. A reset wave is triggered only if this confidence measure falls below a dimensionless parameter P that is called the vigilance parameter. The vigilance parameter calibrates the system's sensitivity to disconfirmed expectations.

One of the main reasons for the successful classification of nonstationary data sequences by ARTMAP is its ability to recalibrate the vigilance parameter based on predictive success. How this works will be described below. For now, we characterize the ART 1 search process given a constant level of vigilance.

In fast-learn ART 1 with choice at $F_2$, the search process occurs as follows:

Step 1—Select one $F_2$ node J that maximizes $T_j$ in (22), and read-out its top-down weight vector $z_J$.

Step 2—With J active, compare the $F_1$ output vector $x = I \cap z_J$ with the $F_0 \rightarrow F_1$ input vector I at the orienting subsystem 26, 28 (FIG. 3).

Step 3A—Suppose that $I \cap z_J$ fails to match I at the level required by the vigilance criterion, i.e., that $$|x| = |I \cap z_J| < \rho|I| \tag{23}$$

$$0 < \rho|I| - |x|$$

Then $F_2$ reset occurs: node J is shut off for the duration of the input interval during which I remains on. The index of the chosen $F_2$ node is reset to the value corresponding to the next highest $F_1 \rightarrow F_2$ input $T_j$. With the new node active, Steps 2 and 3A are repeated until the chosen nodes satisfies the resonance criterion in Step 3B. Note that reset never occurs if $$\rho \leq 0. \tag{24}$$

When (24) holds, an ART system acts as if there were no orienting subsystem.

Step 3B—Suppose that $I \cap z_J$ meets the criterion for resonance; i.e., that $$|x| = |I \cap z_J| \geq \rho|I|. \tag{25}$$

Then the search ceases and the last chosen $F_2$ node J remains active until input I shuts off (or until $\rho$ increases). In this state, called resonance, both the $F_1 \rightarrow F_2$ and the $F_2 \rightarrow F_1$ adaptive weights approach new values if $I \cap z_J^{(old)} \neq z_J^{(old)}$. Note that resonance cannot occur if $\rho > 1$.

If $\rho \leq 1$, search ceases whenever $I \subseteq J$, as is the case if an uncommitted node J is chosen. If vigilance is close to 1, then reset occurs if $F_2 \rightarrow F_1$ input alters the $F_1$ activity pattern at all; resonance requires that I be a subset of $z_J$. If vigilance is near 0, reset never occurs. The top-down expectation $z_J$ of the first chosen $F_2$ node J is then recoded from $z_J^{(old)}$ to $I \cap z_J^{(old)}$, even if I and $z_J^{(old)}$ are very different vectors.

Figure 5:
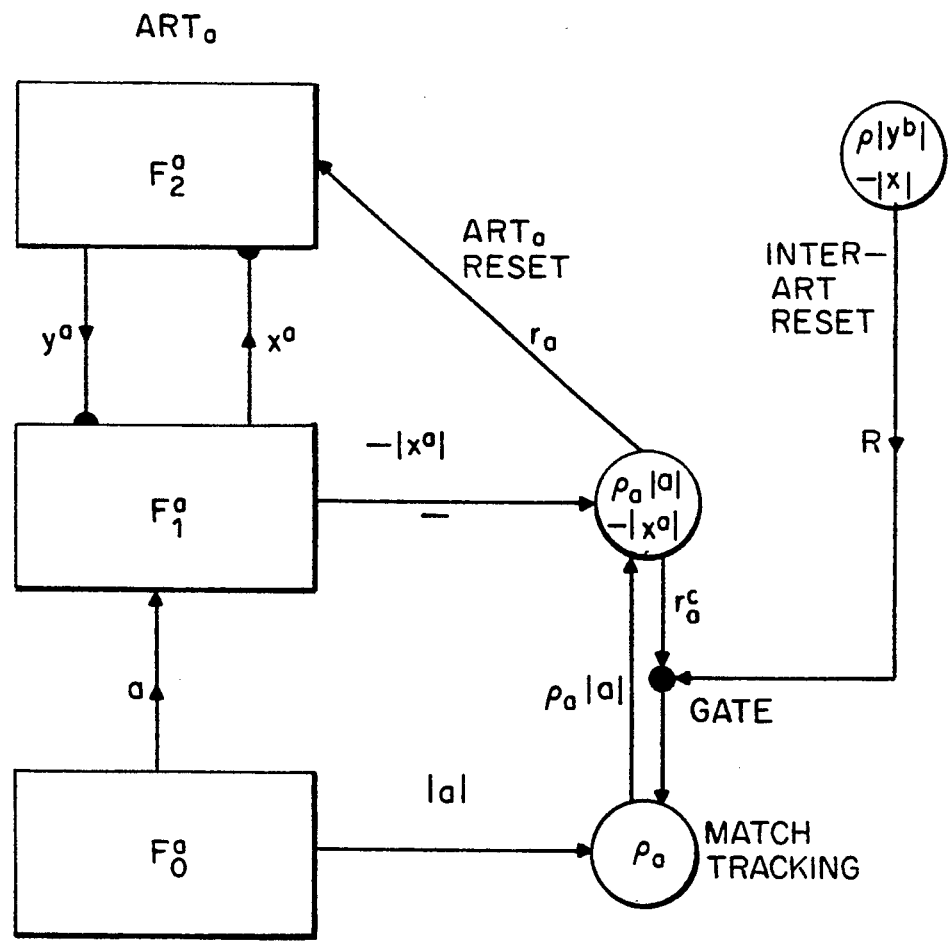
FIG. 5 is a schematic illustration of the $ART_a$ subsystem with match tracking internal control responsive to a reset signal from FIG. 4.

For simplicity, ART 1 is exposed to discrete presentation intervals during which an input is constant and after which $F_1$ and $F_2$ activities are set to zero. Discrete presentation intervals are implemented in ART 1 by means of the $F_1$ and $F_2$ gain control signals $g_1$ and $g_2$ (FIG. 5). The $F_2$ gain signal $g_2$ is assumed, like $g_1$ in (3), to be 0 if $F_0$ is inactive. Then, when $F_0$ becomes active., $g_2$ and $F_2$ signal thresholds are assumed to lie in a range where the $F_2$ node that receives the largest input signal can become active. When an ART 1 system is embedded in a hierarchy, $F_2$ may receive signals from sources other than $F_1$. This occurs in the ARTMAP system described below. In such a system, $F_2$ still makes a choice and gain signals from $F_0$ are still required to generate both $F_1$ and $F_2$ output signals. In the simulations, $F_2$ nodes that are reset during search remain off until the input shuts off. A real-time ART search mechanism that can cope with continuously fluctuating analog or binary inputs of variable duration, fast or slow learning, and compressed or distributed $F_2$ codes is described by Carpenter and Grossberg[11].

The Map Field

Figure 4:
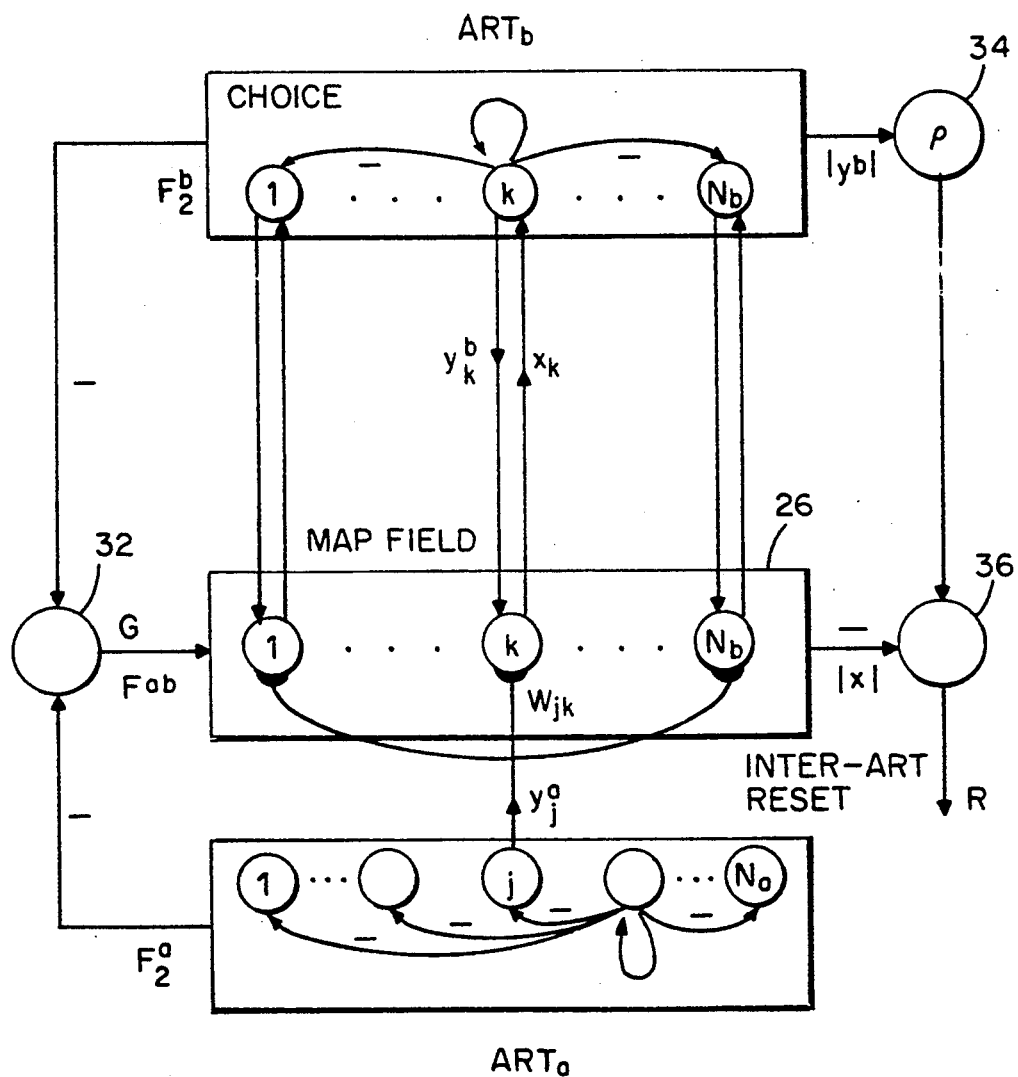
FIG. 4 is a schematic illustration of the associative memory and the $F_2$ fields of FIG. 2 with the associated internal control.

A Map Field module 26 links the $F_2$ fields of the $ART_a$ and $ART_b$ modules. FIG. 4 illustrates the main components of the Map Field. We will describe one such system in the fast-learn mode with choice at the fields $F_2{}^a$ and $F_2{}^b$. As with the ART 1 and ART 2 architectures themselves[9,10], many variations of the network architecture lead to similar computations. In the ARTMAP hierarchy, $ART_a$, $ART_b$ and Map Field modules are all described in terms of ART 1 variables and parameters. Indices a and b identify terms in the $ART_a$ and $ART_b$ modules, while Map Field variables and parameters have no such index. Thus, for example, $\rho_a$, $\rho_b$, and $\rho$ denote the $ART_a$, $ART_b$, and Map Field vigilance parameters, respectively.

Both $ART_a$ and $ART_b$ are fast-learn ART 1 modules. With one optional addition, they duplicate the design described above. That addition, called complement coding, represents both the on-response to an input vector and the off-response to that vector. This ART coding strategy has been shown to play a useful role in searching for appropriate recognition codes in response to predictive feedback 24,25. To represent such a code in its simplest form, let the input vector a itself represent the on-response, and the complement of a, denoted by $a^c$, represent the off-response, for each $ART_a$ input vector a. If a is the binary vector $(a_1, \ldots, a_{Ma})$, the input to $ART_a$ in the $2M_a$-dimensional binary vector.

$$(a, a^c) \equiv (a_1, \ldots, a_{Ma}, a_1{}^c, \ldots, a_{Ma}{}^c) \quad (26)$$

where $$a_i{}^c = 1 - a_i. \quad (27)$$

The utility of complement coding for searching an ARTMAP system will be described below. Conditions will also be given where complement coding is not needed. In fact, complement coding was not needed for any of the simulations described below, and the $ART_a$ input was simply the vector a.

In the discussion of the Map Field module below, $F_2{}^a$ nodes, indexed by $j = 1 \ldots N_a$, have binary output signals $y_j{}^a$; and $F_2{}^b$ nodes indexed by $k = 1 \ldots N_b$, have binary output signals $y_k{}^b$. Correspondingly, the index of the active $F_2{}^a$ node is denoted by J, and the index of the active $F_2{}^b$ node is denoted by K. Because the Map Field is the interface where signals from $F_2{}^a$ and $F_2{}^b$ interact, it is denoted by $F^{ab}$. The nodes of $F^{ab}$ have the same index k, $k = 1, 2, \ldots, N_b$ as the nodes of $F_2{}^b$ because there is a one-to-one correspondence between these sets of nodes.

The output signals of $F^{ab}$ nodes are denoted by $X_k$.

Each node of $F^{ab}$ can receive input from three sources: $F_2{}^a$, $F_2{}^b$, and Map Field gain control 32 (signal G). The $F^{ab}$ output vector x obeys the $\frac{2}{3}$ Rule of ART 1; namely, $$x_k = \begin{cases} 1 & \text{if } y_k{}^b + G + \sum_{j=1}^{Na} y_j{}^a w_{jk} > 1 + w \\ 0 & \text{otherwise} \end{cases} \quad (28)$$

where term $y_k{}^b$ is the $F_2{}^b$ output signal, term G is a binary gain control signal, term $\Sigma y_j{}^a w_{jk}$ is the sum of $F_2{}^a \to F^{ab}$ signals $y_j{}^a$ via pathways with adaptive weights $w_{jk}$, and w is a constant such that $$0 < w < 1. \quad (29)$$

Values of the gain control signal G and the $F_2{}^a \to F^{ab}$ weight vectors $w_j \equiv (w_{j1}, \ldots, w_{jNb})$, $j = 1 \ldots N_a$, are specified below.

Comparison of (1) and (28) indicates an analogy between fields $F_2{}^b$, $F^{ab}$, and $F_2{}^a$ in a Map Field module and fields $F_0$, $F_1$, and $F_2$, respectively, in an ART 1 module. Differences between these modules include the bidirectional non-adaptive connections between $F_2{}^b$ and $F^{ab}$ in the Map Field module (FIG. 4) compared to the bidirectional adaptive connections between fields $F_1$ and $F_2$ in the ART 1 module (FIG. 3). These different connectivity schemes require different rules for the gain control signals G and $g_1$.

The Map Field gain control signal G obeys the equation $$G = \begin{cases} 0 & \text{if } F_2{}^a \text{ and } F_2{}^b \text{ are both active} \\ 1 & \text{otherwise.} \end{cases} \quad (30)$$

Note that G is a persistently active, or tonic, signal that is turned off only when both $ART_a$ and $ART_b$ are active.

If an active $F_2{}^a$ node J has not yet learned a prediction, the ARTMAP system is designed so that J can learn to predict any $ART_b$ pattern if one is active or becomes active while J is active. This design constraint is satisfied using the assumption, analogous to (13), that $F_2{}^a \to F^{ab}$ initial values $$w_{jk}(0) = 1 \quad (31)$$

for $j = 1 \ldots N_a$ and $k = 1 \ldots N_b$.

Rules governing G and $w_j(0)$ enable the following Map Field properties to obtain. If both $ART_a$ and $ART_b$ are active, then learning of $ART_a \to ART_b$ associations can take place at $F^{ab}$. If $ART_a$ is active but $ART_b$ is not, then any previously learned $ART_a \to ART_b$ prediction is read out at $F^{ab}$. If $ART_b$ is active but $ART_a$ is not, then the selected $ART_b$ category is represented at $F^{ab}$. If neither $ART_a$ nor $ART_b$ is active, then $F^{ab}$ is not active. By (28)–(31), the $\frac{2}{3}$ Rule realizes these properties in the following four cases.

1.) $F_2{}^a$ active and $F_2{}^b$ active—If both the $F_2{}^a$ category node J and the $F_2{}^b$ category node K are active, then G = 0 by (30). Thus by (28), $$x_k = \begin{cases} 1 & \text{if } k = K \text{ and } w_{JK} > w \\ 0 & \text{otherwise.} \end{cases} \quad (32)$$

All $x_k=0$ for $k\neq K$. Moreover $x_K=1$ only if an association has previously been learned in the pathway from node J to node K, or if J has not yet learned to predict any $ART_b$ category. If J predicts any category other than K, then all $x_k \equiv 0$.

2.) $F_2{}^a$ active and $F_2{}^b$ inactive—If the $F_2{}^a$ node J is active and $F_2{}^b$ is inactive, then G=1. Thus $$x_k = \begin{cases} 1 & \text{if } w_{JK} > w \\ 0 & \text{otherwise.} \end{cases} \quad (33)$$

By (31) and (33), if an input a has activated node J in $F_2{}^a$ but $F_2{}^b$ is not yet active, J activates all nodes k in $F^{ab}$ if J has learned no predictions. If prior learning has occurred, all nodes k are activated whose adaptive weights $w_{Jk}$ are still large.

3.) $F_2{}^b$ active and $F_2{}^a$ inactive—If the $F_2{}^b$ node K is active and $F_2{}^a$ is inactive, then G=1. Thus $$x_k = \begin{cases} 1 & \text{if } k = K \\ 0 & \text{otherwise.} \end{cases} \quad (34)$$

In this case, the $F^{ab}$ output vector x is the same as the $F_2{}^a$ output vector $y^b$.

4.) $F_2{}^a$ inactive and $F_2{}^b$ inctive—If neither $F_2{}^a$ nor $F_2{}^b$ is active, the total input to each $F^{ab}$ node is G=1, so all $x_k=0$ by (28).

$F_2{}^b$ choice and priming is as follows. If $ART_b$ receives an input b while $ART_a$ has no input, then $F_2{}^b$ chooses the node K with the largest $F_1{}^b \to F_2{}^b$ input. Field $F_2{}^b$ then activates the Kth $F^{ab}$ node, and $F^{ab} \to F_2{}^b$ feedback signals support the original $F_1{}^b \to F_2{}^b$ choice. If $ART_a$ receives an input a while $ART_b$ has no input, $F_2{}^a$ chooses a node J. If, due to prior learning, some $w_{JK}=1$ while all other $w_{Jk}=0$, we say that a predicts the $ART_b$ category K, as $F^{ab}$ sends its signal vector x to $F_2{}^b$. Field $F_2{}^b$ is hereby attentionally primed, or sensitized, but the field remains inactive so long as $ART_b$ has no input from $F_0{}^b$. If then an $F_0{}^b \to F_1{}^b$ input b arrives, the $F_2{}^b$ choice depends upon network parameters and timing. It is natural to assume, however, that b simultaneously activates the $F_1{}^b$ and $F_2{}^b$ gain control signals $g_1{}^b$ and $g_2{}^b$ (FIG. 3). Then $F_2{}^b$ processes the $F^{ab}$ prime x as soon as $F_1{}^2$ processes the input b, and $F_2{}^b$ chooses the primed node K. Field $F_1{}^b$ then receives $F_2{}^b \to F_1{}^b$ expectation input $z_K{}^b$ as well as $F_0{}^b \to F_1{}^b$ input b, leading either to match or reset.

$F_2{}^a \to F^{ab}$ learning laws are as follows. The $F_2{}^a \to F^{ab}$ adaptive weights $w_{jk}$ obey an outstar learning law similar to that governing the $F_2 \to F_1$ weights $z_{ji}$ in (12); namely, $$\frac{d}{dt} w_{jk} = y_j{}^a(x_k - w_{jk}). \quad (35)$$

According to (35), the $F_2{}^a \to F^{ab}$ weight vector $w_j$ approaches the $F^{ab}$ activity vector x if the Jth $F_2{}^a$ node is active. Otherwise $w_j$ remains constant. If node J has not yet learned to make a prediction, all weights $w_{Jk}$ equal 1, by (31). In this case, if $ART_b$ receives no input b, then all $x_k$ values equal 1 by (33). Thus, by (35), all $w_{jk}$ values remain equal to 1. As a result, category choices in $F_2{}^a$ do not alter the adaptive weights $w_{jk}$ until these choices are associated with category choices in $F_2{}^b$.

Map Field Reset And Match Tracking

The Map Field provides the control that allows the ARTMAP system to establish different categories for very similar $ART_a$ inputs that make different predictions, while also allowing very different $ART_a$ inputs to form categories that make the same prediction. In particular, the Map Field orienting subsystem 34, 36 becomes active only when $ART_a$ makes a prediction that is incompatible with the actual $ART_b$ input. This mismatch event activates the control strategy, called match tracking, that modulates the $ART_a$ vigilance parameter $\rho_a$ in such a way as to keep the system from making repeated errors. As illustrated in FIG. 4, a mismatch at $F^{ab}$ while $F_2{}^b$ is active triggers an inter-ART reset signal R to the $ART_a$ orienting subsystem. This occurs whenever $$|x| < \rho |y^b|, \quad (36)$$

where $\rho$ denotes the Map Field vigilance parameter. The entire cycle of $\rho_a$ adjustment proceeds as follows through time. At the start of each input presentation, $\rho_a$ equals a fixed baseline vigilance $\bar{\rho}_a$. When an input a activates an $F_2{}^a$ category node J and resonance is established, $$|x^a| = |a \cap z_J{}^a| \geq \rho_a |a|, \quad (37)$$

as in (25). Thus, there is no reset $r_a$ generated by the $ART_a$ orienting subsystem 38, 39 (FIG. 5). An inter-ART reset signal R is sent to $ART_a$ if the $ART_b$ category predicted by a fails to match the active $ART_b$ category, by (36). The inter-ART reset signal R raises $\rho_a$ to a value that is just high enough to cause (37) to fail, so that $$\rho_a > \frac{|a \cap z_J{}^a|}{|a|}. \quad (38)$$

Node J is therefore reset and an $ART_a$ search ensues. Match tracking continues until an active $ART_a$ category satisfies both the $ART_a$ matching criterion (37) and the analogous Map Field matching criterion. Match tracking increases the $ART_a$ vigilance by the minimum amount needed to abort an incorrect $ART_a \to ART_b$ prediction and to drive a search for a new $ART_a$ category that can establish a correct prediction. As shown by example below, match tracking allows a to make a correct prediction on subsequent trials, without repeating the initial sequence of errors. Match tracking hereby conjointly maximizes predictive generalization and minimizes predictive error on a trial-by-trial basis, using only local computations.

The operation of match tracking can be implemented in several different ways. One way is to use a variation on the Vector Integration to Endpoint, or VITE, circuit[26] as follows. Let an $ART_a$ binary reset signal $r_a$ (FIG. 5) obey the equation $$r_a = \begin{cases} 1 & \text{if } \rho_a |a| - |x^a| > 0 \\ 0 & \text{otherwise,} \end{cases} \quad (39)$$

as in (23). The complementary $ART_a$ resonance signal $r_a{}^c = 1 - r_a$. Signal R equals 1 during inter-ART rest; that is, when inequality (36) holds. The size of the $ART_a$ vigilance parameter $\rho_a$ at 38 is determined by the match tracking equation $$\frac{d}{dt} \rho_a = (\bar{\rho}_a - \rho_a) + \gamma R r_a{}^c, \qquad (40)$$

where $\gamma > 1$. During inter-ART reset, $R = r_a = 1$, causing $\rho_a$ to increase until $r_a{}^c = 0$. Then $\rho_a |a| > |x^a|$, as required for match tracking (38). When $r_a{}^c = 0$, $\rho_a$ relaxes to $\bar{\rho}_a$. This is assumed to occur at a rate slower than node activation, also called short term memory (STM), and faster than learning, also called long term memory (LTM). Such an intermediate rate is called medium term memory (MTM)[11]. Thus the higher vigilance with continued input to $F_0{}^a$ will be maintained for subsequent search.

An $ART_a$ search that is triggered by increasing $\rho_a$ according to (40) ceases if some active $F_2{}^a$ node J satisfies $$|a \cap z_J{}^a| \geq \rho_a |a|. \qquad (41)$$

If no such node exists, $F_2{}^a$ shuts down for the rest of the input presentation. In particular, if $a \subseteq z_J{}^a$, match tracking makes $\rho_a > 1$, so a cannot activate another category in order to learn the new prediction. The following anomalous case can thus arise. Suppose that $a = z_J{}^a$ but the $ART_b$ input b mismatches the $ART_b$ expectation $z_K{}^b$ previously associated with J. Then match tracking will prevent the recoding that would have associated a with b. That is, the ARTMAP system with fast learning and choice will not learn the prediction of an exemplar that exactly matches a learned prototype when the new prediction contradicts the previous predictions of the exemplars that created the prototype. This situation does not arise when all $ART_a$ inputs a have the same number of 1's, as follows.

Consider the case in which all $ART_a$ inputs have the same norm:

$$|a| = \text{constant}. \qquad (42)$$

When an $ART_a$ category node J becomes committed to input a, then $|z_J{}^a| = |a|$. Thereafter, by the $\frac{2}{3}$ Rule (15), $z_J{}^a$ can be recoded only by decreasing its number of 1 entries, and thus its norm. Once this occurs, no input a can ever be a subset of $z_J{}^a$, by (42). In particular, the situation described in the previous section cannot arise.

In the simulations reported below, all $ART_a$ inputs have norm 22. Equation (42) can also be satisfied by using complement coding, since $|(a, a^c)| = M_a$. Preprocessing $ART_a$ inputs by complement coding thus ensures that the system will avoid the case where some input a is a proper subset of the active $ART_a$ prototype $z_J{}^a$ and the learned prediction of category J mismatches the correct $ART_b$ pattern.

Finally, note that with ARTMAP fast learning and choice, an $ART_a$ category node J is permanently committed to the first $ART_b$ category node K to which it is associated. However, the set of input exemplars that access either category may change through time, as in the banana example described in the introduction.

The role of match tracking is illustrated by the following example. The input pairs shown in Table 1 are presented in order $a^{(1)}$, $b^{(1)}$), ($a^{(2)}$, $b^{(2)}$), ($a^{(3)}$, $b^{(3)}$). The problem solved by match tracking is created by vector $a^{(2)}$ lying "between" $a^{(1)}$ and $a^{(3)}$, with $a^{(1)} \quad a^{(2)} \quad a^{(3)}$, while $a^{(1)}$ and $a^{(3)}$ are mapped to the same $ART_b$ vector. Suppose that, instead of match tracking, the Map Field orienting subsystem merely activated the $ART_a$ reset system. Coding would then proceed as follows.

TABLE 1

| $ART_a$ inputs | $ART_b$ inputs |
|---|---|
| $a^{(1)}$ (111000) | $b^{(1)}$ (1010) |
| $a^{(2)}$ (111100) | $b^{(2)}$ (0101) |
| $a^{(3)}$ (111110) | $b^{(3)}$ (1010) |

Table 1: Nested $ART_a$ inputs and their associated $ART_b$ inputs.

Choose $\rho_a \leq 0.6$ and $\rho_b > 0$. Vectors $a^{(1)}$ then $b^{(1)}$ are presented, activate $ART_a$ and $ART_b$ categories $J = 1$ and $K = 1$, and the category $J = 1$ learns to predict category $K = 1$, thus associating $a^{(1)}$ with $b^{(1)}$. Next $a^{(2)}$ then $b^{(2)}$ are presented. Vector $a^{(2)}$ first activates $J = 1$ without reset, since $$\frac{|a^{(2)} \cap z_1{}^a|}{|a^{(2)}|} = \frac{3}{4} \geq \rho_a = \bar{\rho}_a. \qquad (43)$$

However, node $J = 1$ predicts node $K = 1$. Since $$\frac{|b^{(2)} \cap z_1{}^b|}{|b^{(2)}|} = 0 < \rho_b, \qquad (44)$$

$ART_b$ search leads to activation (selection) of a different $F_2{}^b$ node, $K = 2$. Because of the conflict between the prediction ($K = 1$) made by the active $F_2{}^a$ node and the currently active $F_2{}^b$ node ($K = 2$), the Map Field orienting subsystem resets $F_2{}^a$, but without match tracking. Thereafter a new $F_2{}^a$ node ($J = 2$) learns to predict the correct $F_2{}^b$ node ($K = 2$), associating $a^{(2)}$ with $b^{(2)}$.

Vector $a^{(3)}$ first activates $J = 2$ without $ART_a$ reset, thus predicting $K = 2$, with $z_2{}^b = b^{(2)}$. However, $b^{(3)}$ mismatches $z_2{}^b$, leading to activation of the $F_2{}^b$ node $K = 1$, since $b^{(3)} = b^{(1)}$. Since the predicted node ($K = 2$) then differs from the active node ($K = 1$), the Map Field orienting subsystem again resets $R_2{}^a$. At this point, still without match tracking, the $F_2{}^a$ node $J = 1$ would become active, without subsequent $ART_a$ reset, since $z_1{}^a = a^{(1)}$ and $$\frac{|a^{(3)} \cap a^{(1)}|}{|a^{(3)}|} = \frac{3}{5} \geq \rho_a = \bar{\rho}_a. \qquad (45)$$

Since node $J = 1$ correctly predicts the active node $K = 1$, no further reset or new learning would occur. On subsequent prediction trials, vector $a^{(3)}$ would once again activate $J = 2$ and then $K = 2$. When vector $b^{(3)}$ is not presented, on a test trial, vector $a^{(3)}$ would not have learned its correct prediction; rather, $b^{(2)}$ would be incorrectly predicted.

With match tracking, when $a^{(3)}$ is presented, the Map Field orienting subsystem causes $\rho_a$ to increase to a value slightly greater than $|a^{(3)} \cap a^{(2)}| |a^{(3)}|^{-1} = 0.8$ while node $J = 2$ is active. Thus after node $J = 2$ is reset, node $J = 1$ will also be reset because $$\frac{|a^{(3)} \cap a^{(1)}|}{|a^{(3)}|} = 0.6 < 0.8 < \rho_a. \qquad (46)$$

The reset of node J=1 permits $a^{(3)}$ to choose an uncommitted $F_2^a$ node (J=3) that is then associated with the active $F_2^b$ node (K=1). Because vector $a^{(3)}$ is exactly learned at the new J=3 node, subsequent $a^{(3)}$ inputs will select J=3 directly at any vigilance; J=2 will not first be selected. Thereafter each $ART_a$ input predicts the correct $ART_b$ output without search or error unaffected by the lower base level of vigilance.

If a high level of vigilance had been initially set as the baseline vigilance, $a^{(1)}$, $a^{(2)}$, and $a^{(3)}$ would have been learned at nodes J=1, 2 and 3 with reset at the baseline vigilance and without the need for reset from the mapping field. However, in a typical system the high baseline vigilance would result in smaller categories, that is more precisely defined categories for all input patterns. Thus there would be an unnecessary loss in generalization. By providing a lower level of vigilance which is tracked where necessary with mismatch at the mapping field, the system is able to maximize generalization at the lower vigilance levels while minimizing predictive error by tracking to higher vigilance where required. In choosing baseline vigilance, one must balance the need for generalization against the risk of early predictive errors in the learning process.

The utility of $ART_a$ complement coding is illustrated by the following example. Assume that the nested input pairs in Table 7 are presented to an ARTMAP system in order $(a^{(3)}, b^{(3)})$, $(a^{(2)}, b^{(2)})$, $(a^{(1)}, b^{(1)})$, with match tracking but without complement coding. Choose $\rho_a < 0.5$ and $\rho_b > 0$.

Vectors $a^{(3)}$ and $b^{(3)}$ are presented and activate $ART_a$ and $ART_b$ categories J=1 and K=1. The system learns to predict $b^{(3)}$ given $a^{(3)}$ by associating the $F_2^a$ node J=1 with the $F_2^b$ node K=1.

Next $a^{(2)}$ and $b^{(2)}$ are presented. Vector $a^{(2)}$ first activates J=1 without reset, since $|a^{(2)} \cap z_1^a| |a^{(2)}|^{-1} = 1 \geq \rho_a = \rho_a$. However, node J=1 predicts node K=1. As in the previous example, after $b^{(2)}$ is presented, the $F_2^b$ node K=2 becomes active and leads to an inter-ART reset. Match tracking makes $\rho_a > 1$, so $F_2^a$ shuts down until the pair $(a^{(2)}, b^{(2)})$ shuts off. Pattern $b^{(2)}$ is coded in $ART_b$ as $z_2^b$, but no learning occurs in the $ART_a$ and $F^{ab}$ modules.

Next $a^{(1)}$ activates J=1 without reset, since $|a^{(1)} \cap z_1^a| |a^{(1)}|^{-1} = 1 \geq \rho_a = \rho_a$. Since node J=1 predicts the correct pattern $b^{(1)} = z_1^b$, no reset ensues. Learning does occur, however, since $z_a^a$ shrinks to $a^{(1)}$. If each input can be presented only once, $a^{(2)}$ does not learn to predict $b^{(2)}$. However if the input pairs are presented repeatedly, match tracking allows $ART_a$ to establish 3 category nodes and an accurate mapping.

With complement coding, the correct map can be learned on-line for any $\rho_a > 0$. The critical difference is due to the fact that $|a^{(2)} \cap z_1^a| |a^{(2)}|^{-1}$ now equals 5/6 when $a^{(2)}$ is first presented, rather than equaling 1 as before. Thus either $ART_a$ reset (if $\rho_a > 5/6$) or match tracking (if $\rho_a \leq 5/6$) establishes a new $ART_a$ node rather than shutting down on that trial. On the next trial, $a^{(1)}$ also establishes a new $ART_a$ category that maps to $b^{(1)}$.

SIMULATION ALGORITHMS

ART 1 Algorithm

Fast-learn ART 1 with binary $F_0 \rightarrow F_1$ input vector I and choice at $F_2$ can be simulated by following the rules below. Fields $F_0$ and $F_1$ have M nodes and field $F_2$ has N nodes.

Initially all $F_2$ nodes are said to be uncommitted. Weights $Z_{ij}$ in $F_1 \rightarrow F_2$ paths initially satisfy $$Z_{ij}(0) = \alpha_j, \tag{A1}$$

where $Z_j \equiv (Z_{1j}, \ldots, Z_{Mj})$ denotes the bottom-up $F_1 \rightarrow F_2$ weight vector. Parameters $\alpha_j$ are ordered according to $$\alpha_1 > \alpha_2 > \ldots > \alpha_N, \tag{A2}$$

where $$0 < \alpha_j < \frac{1}{(\beta + |I|)} \tag{A3}$$

for $\beta > 0$ and for any admissible $F_0 \rightarrow F_1$ input I. In the simulations in this article, $\alpha_j$ and $\beta$ are small.

Weights $z_{ji}$ in $F_2 \rightarrow F_1$ paths initially satisfy $$z_{ji}(0) = 1 \tag{A4}$$

The top-down, $F_2 \rightarrow F_1$ weight vector $(z_{j1}, \ldots, z_{jM})$ is denoted $z_j$.

The binary $F_1$ output vector $x \equiv (x_1, \ldots, x_M)$ is given by $$x = \begin{cases} I & \text{if } F_2 \text{ is inactive} \\ I \cap z_J & \text{if the } J\text{th } F_2 \text{ node is active.} \end{cases} \tag{A5}$$

The input $T_j$ from $F_1$ to the jth $F_2$ node obeys $$T_j = \begin{cases} |I|\alpha_j & \text{if } j \text{ is an uncommitted node index} \\ |I \cap z_j|/(\beta + |z_j|) & \text{if } j \text{ is a committed node index.} \end{cases} \tag{A6}$$

The set of committed $F_2$ nodes and update rules for vectors $z_j$ and $Z_j$ are defined iteratively below.

If $F_0$ is active ($|I| > 0$), the initial choice at $F_2$ is one node with index J satisfying $$T_J = \max_j(T_j). \tag{A7}$$

If more than one node is maximal, one of these is chosen at random. After an input presentation on which node J is chosen, J becomes committed. The $F_2$ output vector is denoted by $y \equiv (y_1, \ldots, y_N)$.

ART 1 search ends upon activation of an $F_2$ category with index j=J that has the largest $T_j$ value and that also satisfies the inequality $$|I \cap z_J| \geq \rho |I| \tag{A8}$$

where $\rho$ is the ART 1 vigilance parameter. If such a node J exists, that node remains active, or in resonance, for the remainder of the input presentation. If no node satisfies (A8), $F_2$ remains inactive after search, until I shuts off.

At the end of an input presentation the $F_2 \rightarrow F_1$ weight vector $Z_J$ satisfies $$Z_J = I \cap z_J^{(old)} \quad (A9)$$

where $z_J^{(old)}$ denotes $z_J$ at the start of the current input presentation. The $F_1 \rightarrow F_2$ weight vector $Z_J$ satisfies $$Z_J = \frac{I \cap z_J^{(old)}}{\beta + |I \cap z_J^{(old)}|}. \quad (A10)$$

ARTMAP algorithm

The ARTMAP system incorporates two ART modules and an inter-ART module linked by the following rules.

$ART_a$ and $ART_b$ are fast-learn ART 1 modules. Inputs to $ART_a$ may, optionally, be in the complement code form. Embedded in an ARTMAP system, these modules operate as outlined above, with the following additions. First, the $ART_a$ vigilance parameter $\rho_a$ can increase during inter-ART reset according to the match tracking rule. Second, the Map Field $F^{ab}$ can prime $ART_b$. That is, if $F^{ab}$ sends nonuniform input to $F_2^b$ in the absence of an $F_0^b \rightarrow F_1^b$ input b, then $F_2^b$ remains inactive. However, as soon as an input b arrives, $F_2^b$ chooses the node K receiving the largest $F^{ab} \rightarrow F_2^b$ input. Node K, in turn, sends to $F_1^b$ the top-down input $z_K^b$. Rules for match tracking and complement coding are specified below.

Let $x^a \equiv (x_1^a \ldots x_{Ma}^a)$ denote the $F_1^a$ output vector; let $y^a \equiv (y_1^a \ldots y_{Na}^a)$ denote the $F_2^a$ output vector; let $x^b \equiv (x_1^b \ldots x_{Mb}^b)$ denote the $F_1^b$ output vector; and let $y^b \equiv (y_1^b \ldots y_{Nb}^b)$ denote the $F_2^b$ output vector. The Map Field $F^{ab}$ has $N_b$ nodes and binary output vector x. Vectors $x^a$, $y^a$, $x^b$, $y^b$, and x are set to 0 between input presentations.

Map Field learning is as follows. Weights $w_{jk}$, where $j = 1 \ldots N_a$ and $k = 1 \ldots N_b$, in $F_2^a \rightarrow F^{ab}$ paths initially satisfy $$w_{jk}(0) = 1. \quad (A11)$$

Each vector $(w_{j1}, \ldots w_{jNb})$ is denoted $w_j$. During resonance with the $ART_a$ category J active, $w_J \rightarrow x$. In fast learning, once J learns to predict the $ART_b$ category K, that association is permanent; i.e., $w_{JK} = 1$ for all times.

Map Field activation is as follows. The $F^{ab}$ output vector x obeys $$x = \begin{cases} y^b \cap w_J & \text{if the Jth } F_2^a \text{ node is active and } F_2^b \text{ is active} \\ w_J & \text{if the Jth } F_2^a \text{ node is active and } F_2^b \text{ is inactive} \\ y^b & \text{if } F_2^a \text{ is inactive and } F_2^b \text{ is active} \\ 0 & \text{if } F_2^a \text{ is inactive and } F_2^b \text{ is inactive.} \end{cases} \quad (A12)$$

Match tracking is as follows. At the start of each input presentation the $ART_a$ vigilance parameter $\rho_a$ equals a baseline vigilance $\bar{\rho}_a$. The Map Field vigilance parameter is $\rho$. If $$|x| < \rho|y^b|, \quad (A13)$$

then $\rho_a$ is increased until it is slightly larger than $|a \cap z_J^a| |a|^{-1}$. Then $$|x^a| = |a \cap z_J^a| < \rho_a |a|, \quad (A14)$$

where a is the current $ART_a$ input vector and J is the index of the active $F_2^a$ node. When this occurs, $ART_a$ search leads either to activation of a new $F_2^a$ node J with $$|x^a| = |a \cap z_J^a| \geq \rho_a |a| \quad (A15)$$

and $$|x| = |y^b \cap w_J| \geq \rho|y^b|; \quad (A16)$$

or, if no such node exists, to the shut-down of $F_2^a$ for the remainder of the input presentation.

The optional feature of a complement coding arranges $ART_a$ inputs as vectors $$(a, a^c) \equiv (a_1 \ldots a_{Ma}, a_1^c \ldots a_{Ma}^c), \quad (A17)$$

where $$a_i^c \equiv 1 - a_i. \quad (A18)$$

Complement coding may be useful if the following set of circumstances could arise: an $ART_a$ input vector a activates an $F_2^a$ node J previously associated with an $F_2^b$ node K; the current $ART_b$ input b mismatches $z_K^b$; and a is a subset of $z_J^a$. These circumstances never arise if all $|a| \equiv$ constant. For the simulations in this article, $|a| \equiv 22$. With complement coding, $|(a, a^c)| \equiv M_a$.

ARTMAP processing

The following nine cases summarize fast-learn ARTMAP system processing with choice at $F_2^a$ and $F_2^b$ and with Map Field vigilance $\rho > 0$. Inputs a and b could appear alone, or one before the other. Input a could make a prediction based on prior learning or make no prediction. If a does make a prediction, that prediction may be confirmed or disconfirmed by b. The system follows the rules outlined in the previous section assuming, as in the simulations, that all $|a| \equiv$ constant and that complement coding is not used. For each case, changing weight vectors $z_J^a$, $z_K^b$, and $w_K$ are listed. Weight vectors $Z_J^a$ and $Z_K^b$ change accordingly, by (A11). All other weights remain constant.

Case 1: a only, no prediction. Input a activates a matching $F_2^a$ node J, possibly following $ART_a$ search. All $F_2^a \rightarrow F^{ab}$ weights $W_{Jk} = 1$, so all $x_k = 1$. $ART_b$ remains inactive. With learning $z_J^a \rightarrow z_J^{a(old)} \cap a$.

Case 2: a only, with prediction. Input a activates a matching $F_2^a$ node J. Weight $w_{JK} = 1$ while all other $w_{Jk} = 0$, and $x = w_J$. $F_2^b$ is primed, but remains inactive. With learning, $Z_J^a \rightarrow z_J^{a(old)} \cap a$.

Case 3: b only. Input b activates a matching $F_2^b$ node K, possibly following $ART_b$ search. At the Map Field, $x = y^b$. $ART_a$ remains inactive. With learning, $z_K^b \rightarrow z_K^{b(old)} \cap b$.

Case 4: a then b, no prediction. Input a activates a matching $F_2^a$ node J. All $x_k$ become 1 and $ART_b$ is inactive, as in Case 1. Input b then activates a matching $F_2^b$ node K, as in Case 3. At the Map Field $x \rightarrow y^b$; that is, $x_K = 1$ and other $x_k = 0$. With learning $Z_J^a \rightarrow z_J^{a(old)} \cap a$, $z_K^b \rightarrow z_K^{b(old)} \cap b$, and $w_J \rightarrow y^b$; i.e., J learns to predict K.

Case 5: a then b, with prediction confirmed. Input a activates a matching $F_2^a$ node J, which in turn activates a single Map Field node K and primes $F_2^b$, as in Case 2.

When input b arrives, the Kth $F_2^b$ node becomes active and the prediction is confirmed; that is, $$|b \cap z_K^b| \geq \rho_b |b| \qquad (A19)$$

Note that K may not be the $F_2^b$ node b would have selected without the $F^{ab} \to F_2^b$ prime. With learning, $z_J^a \to z_J^{a(old)} \cap a$ and $z_K^b \to a_K^{b(old)} \cap b$.

Case 6. a then b, prediction not confirmed. Input a activates a matching $F_2^a$ node, which in turn activates a single Map Field node and primes $F_2^b$, as in Case 5. When input b arrives, (A19) fails, leading to reset of the $F_2^b$ node via $ART_b$ reset. A new $F_2^b$ node K that matches b becomes active. The mismatch between the $F_2^a \to F^{ab}$ weight vector and the new $F_2^b$ vector $y^b$ sends Map Field activity x to 0, by (A12), leading to Map Field reset, by (A13). By match tracking, $\rho_a$ grows until (A14) holds. This triggers an $ART_a$ search that will continue until, for an active $F_2^a$ node J, $w_{JK} = 1$, and (A15) holds. If such an $F_2^a$ node does become active, learning will follow, setting $z_J^a \to z_J^{a(old)} \cap a$ and $z_K^b \to z_K^{b(old)} \cap b$. If the $F_2^a$ node J is uncommitted, learning sets $w_J \to y^b$. If no $F_2^a$ node J that becomes active satisfies (A15) and (A16), $F_2^a$ shuts down until the inputs go off. In that case, with learning, $z_K^b \to z_K^{b(old)} \cap b$.

Case 7: b then a, no prediction. Input b activates a matching $F_2^b$ node K, then $X = y^b$, as in Case 3. Input a then activates a matching $F_2^a$ node J with all $w_{Jk} = 1$. At the Map Field, x remains equal to $y^b$. With learning, $z_J^a \to z_J^a(old) \cap a$, $w_J \to y^b$, and $z_K^b \to z_K^{b(old)} \cap b$.

Case 8: b then a, with prediction confirmed. Input b activates a matching $F_2^b$ node K, then $x = y^b$, as in Case 7. Input a then activates a matching $F_2^a$ node J with $w_{JK} = 1$ and all other $w_{Jk} = 0$. With learning $z_J^a \to z_J^{a(old)} \cap a$ and $z_K^b \to z_K^{b(old)} \cap b$.

Case 9: b then a, with prediction not confirmed. Input b activates a matching $F_2^b$ node K, then $x = y^b$ and input a activates a matching $F_2^a$ node, as in Case 8. However (A16) fails and $x \to 0$, leading to a Map Field reset. Match tracking resets $\rho_a$ as in Case 6, $ART_a$ search leads to activation of an $F_2^a$ node (J) that either predicts K or makes no prediction, or $F_2^a$ shuts down. With learning $z_K^b \to z_K^{b(old)} \cap b$. If J exists, $z_J^a \to z_J^{a(old)} \cap a$; and if J initially makes no prediction, $w_J \to y^b$, i.e., J learns to predict K.

ARTMAP Simulations: Distinguishing Edible And Poisonous Mushrooms

The ARTMAP system was tested on a benchmark machine learning database that partitions a set of vectors a into two classes. Each vector a characterizes observable features of a mushroom as a binary vector, and each mushroom is classified as edible or poisonous. The database represents the 11 species of genus Agaricus and the 12 species of the genus Lepiota described in *The Audubon Society Field Guide to North American Mushrooms*[19]. These two genera constitute most of the mushrooms described in the *Field Guide* from the family Agaricaceae (order Agaricales, class Hymenomycetes, subdivision Basidiomycetes, division Eumycota). All the mushrooms represented in the database are similar to one another: "These mushrooms are placed in a single family on the basis of a correlation of characteristics that include microscopic and chemical features . . ."[19] (p.500). The *Field Guide* warns that poisonous and edible species can be difficult to distinguish on the basis of their observable features. For example, the poisonous species Agaricus californicus is described as a "dead ringer" for the Meadow Mushroom, *Agaricus campestris*, that "may be known better and gathered more than any other wild mushroom in North America" (p. 505). This database thus provides a test of how ARTMAP and other machine learning systems distinguish rare but important events from frequently occurring collections of similar events that lead to different consequences.

The database of 8124 exemplars describes each of 22 observable features of a mushroom, along with its classification as poisonous (48.2%) or edible (51.8%). The 8124 "hypothetical examples" represent ranges of characteristics within each species; for example, both *Agaricus californicus* and *Agaricus campestris* are described as having a "white to brownish cap," so in the database each species has corresponding sets of exemplar vectors representing their range of cap colors. There are 126 different values of the 22 different observable features. A list of the observable features and their possible values is given in Table 2. For example, the observable feature of "cap-shape" has six possible values. Consequently, the vector inputs to $ART_a$ are 126-element binary vectors, each vector having 22 1's and 104 0's, to denote the values of an exemplar's 22 observable features. The $ART_b$ input vectors are (1,0) for poisonous exemplars and (0,1) for edible exemplars.

The ARTMAP system learned to classify test vectors rapidly and accurately, and system performance compares favorably with results of other machine learning algorithms applied to the same database. The STAGGER algorithm reached its maximum performance level of 95% accuracy after exposure to 1000 training inputs[20]. The HILLARY algorithm achieved similar results[21]. The ARTMAP system consistently achieved over 99% accuracy with 1000 exemplars, even counting "I don't know" responses as errors. Accuracy of 95% was usually achieved with on-line training on 300–400 exemplars and with off-line training on 100–200 exemplars. In this sense, ARTMAP was an order of magnitude more efficient than the alternative systems. In addition, with continued training, ARTMAP predictive accuracy always improved to 100%. These results are elaborated below.

Almost every ARTMAP simulation was completed in under two minutes on an IRIS TM 4D computer, with total time ranging from about one minute for small training sets to two minutes for large training sets. This is comparable to 2–5 minutes on a SUN TM 4 computer. Each timed simulation included a total of 8124 training and test samples, run on a time-sharing system with non-optimized code. Each 1–2 minute computation included data read-in and read-out, training, testing, and calculation of multiple simulation indices.

On-line learning imitates the conditions of a human or machine operating in a natural environment. An input a arrives, possibly leading to a prediction. If made, the prediction may or may not be confirmed. Learning ensues, depending on the accuracy of the prediction. Information about past inputs is available only through the present state of the system. Simulations of on-line learning by the ARTMAP system use each sample pair (a,b) as both a test item and a training item. Input a first makes a prediction that is compared with b. Learning follows as dictated by the internal rules of the ARTMAP architecture.

Four types of on-line simulations were carried out, using two different baseline settings of the $ART_a$ vigilance parameter $\rho_a$: $\rho_a = 0$ (forced choice condition) and $\rho_a=0.7$ (conservative condition); and using sample replacement or no sample replacement. With sample replacement, any one of the 8124 input samples was selected at random for each input presentation. A given sample might thus be repeatedly encountered while others were still unused. With no sample replacement, a sample was removed from the input pool after it was first encountered. The replacement condition had the advantage that repeated encounters tended to boost predictive accuracy. The no-replacement condition had the advantage of having learned from a somewhat larger set of inputs at each point in the simulation. The replacement and no-replacement conditions had similar performance indices, all other things being equal. Each of the 4 conditions was run on 10 independent simulations. With $\rho_a=0$, the system made a prediction in response to every input. Setting $\rho_a=0.7$ increased the number of "I don't know" responses, increased the number of $ART_a$ categories, and decreased the rate of incorrect predictions to nearly 0%, even early in training. The $\rho_a=0.7$ condition generally outperformed the $\rho_a=0$ condition, even when incorrect predictions and "I don't know" responses were both counted as errors. The primary exception occurred very early in training, when a conservative system gives the large majority of its no-prediction responses.

Results are summarized in Table 3. Each entry gives the number of correct predictions over the previous 100 trials (input presentations), averaged over 10 simulations. For example, with $\rho_a=0$ in the no-replacement condition, the system made, on the average, 94.9 correct predictions and 5.1 incorrect predictions on trials 201-300. In all cases a 95% correct-prediction rate was achieved before trial 400. With $\rho_a=0$, a consistent correct-prediction rate of over 99% was achieved by trial 1400, while with $\rho_a=0.7$ the 99% consistent correct-prediction rate was achieved earlier, by trial 800. Each simulation was continued for 8100 trials. In all four cases, the minimum correct-prediction rate always exceeded 99.5% by trial 1800 and always exceeded 99.8% by trial 2800. In all cases, across the total of 40 simulations summarized in Table 2, 100% correct prediction was achieved on the last 1300 trials of each run.

Note the relatively low correct-prediction rate for $\rho_a=0.7$ on the first 100 trials. In the conservative mode, a large number of inputs initially make no prediction. With $\rho_a=0.7$ an average total of only 2 incorrect predictions were made on each run of 8100 trials. Note too that Table 3 underestimates prediction accuracy at any given time, since performance almost always improves during the 100 trials over which errors are tabulated.

In off-line learning, a fixed training set is repeatedly presented to the system until 100% accuracy is achieved on that set. For training sets ranging in size from 1 to 4000 samples, 100% accuracy was almost always achieved after one or two presentations of each training set. System performance was then measured on the test set, which consisted of all 8124 samples not included in the training set. During testing no further learning occurred.

The role of repeated training set presentations was examined by comparing simulations that used the 100% training set accuracy criterion with simulations that used only a single presentation of each input during training. With only a few exceptions, performance was similar. In fact for $\rho_a=0.7$, and for small training sets with $\rho_a=0$, 100% training-set accuracy was achieved with single input presentations, so results were identical. Performance differences were greatest for $\rho_a=0$ simulations with mid-sized training sets (60-500 samples), when 2-3 training set presentations tended to add a few more $ART_a$ learned category nodes. Thus, even a single presentation of training-then-testing inputs, carried out on-line, can be made to work almost as well as off-line training that uses repeated presentations of the training set. This is an important benefit of fast learning controlled by a match tracked search.

The simulations summarized in Table 4 illustrate off-line learning with $\rho hd\ a=0$. In this forced choice case, each $ART_a$ input led to a prediction of poisonous or edible. The number of test set errors with small training sets was relatively large, due to the forced choice. The table illustrates system performance after training on input sets ranging in size from 3 to 4000 exemplars. Each line shows average correct and incorrect test set predictions over 10 independent simulations, plus the range of learned $ART_a$ category numbers.

Table 4 summarizes the average results over 10 simulations at each size training set. For example, with very small, 5-sample training sets, the system established between 1 and 5 $ART_a$ categories, and averaged 73.1% correct responses on the remaining 8119 test patterns. Success rates ranged from chance (51.8%, one category) in one instance where all five training set exemplars happened to be edible, to surprisingly good (94.2%, 2 categories). The range of success rates for fast-learn training on very small training sets illustrates the statistical nature of the learning process. Intelligent sampling of the training set or, as here, good luck in the selection of representative samples, can dramatically alter early success rates. In addition, the evolution of internal category memory structure, represented by a set of $ART_a$ category nodes and their top-down learned expectations, is influenced by the selection of early exemplars. Nevertheless, despite the individual nature of learning rates and internal representations, all the systems eventually converge to 100% accuracy on test set exemplars using only approximately) 1/600 as many $ART_a$ categories as there are inputs to classify.

As in the case of poisonous mushroom identification, it may be important for a system to be able to respond "I don't know" to a novel input, even if the total number of correct classifications thereby decreases early in learning. For higher values of the baseline vigilance $\rho_a$, the ARTMAP system creates more $ART_a$ categories during learning and becomes less able to generalize from prior experience than when $\rho_a$ equals 0. During testing, a conservative coding system with $\rho_a=0.7$ makes no prediction in response to inputs that are too novel, and thus initially has a lower proportion of correct responses. However, the number of incorrect responses is always low with $\rho_a=0.7$, even with very few training samples, and the 99% correct-response rate is achieved for both forced choice ($\rho_a=0$) and conservative ($\rho_a=0.7$) systems with training sets smaller than 1000 exemplars.

Table 5 summarizes simulation results that repeat the conditions of Table 4 except that $\rho_a=0.7$. Here, a test input that does not make a 70% match with any learned expectation makes an "I don't know" prediction. Compared with the $\rho_a=0$ case of Table 4, Table 5 shows that larger training sets are required to achieve a correct prediction rate of over 95%. However, because of the option to make no prediction, the average test set error rate is almost always less than 1%, even when the training set is very small, and is less than 0.1% after only 500 training trials. Moreover, 100% accuracy is achieved using only (approximately) 1/130 as many $ART_a$ categories as there are inputs to classify.

Each ARTMAP category code can be described as a set of $ART_a$ feature values on 1 to 22 observable features, chosen from 126 feature values, that are associated with the $ART_b$ identification as poisonous or edible. During learning, the number of feature values that characterize a given category is monotone decreasing, so that generalization within a given category tends to increase. The total number of classes can, however, also increase, which tends to decrease generalization. Increasing the number of training patterns hereby tends to increase the number of categories and decrease the number of critical feature values of each established category. The balance between these opposing tendencies leads to the final net level of generalization.

Table 6 illustrates the long term memory structure underlying the 125-sample forced-choice simulation $\rho_a=0$. Of the nine categories established at the end of the training phase, 4 are identified as poisonous (P) and 5 are identified as edible (E). Categories 1, 5, 7 and 8 are identified as poisonous (P) and categories 2, 3, 4, 6, and 9 are identified as edible (E). Each $ART_a$ category assigns a feature value to a subset of the 22 observable features. For example, Category 1 (poisonous) specifies values for 5 features, and leaves the remaining 17 features unspecified. The corresponding $ART_a$ weight vector has 5 ones and 121 zeros. Note that the features that characterize category 5 (poisonous) form a subset of the features that characterize category 6 (edible). This category structure gave 96.4% correct responses on the 7999 test set samples, which are partitioned as shown in the last line of Table 5. When 100% accuracy is achieved, a few categories with a small number of specified features typically code large clusters, while a few categories with many specified features code small clusters of rare samples.

Table 7 illustrates the statistical nature of the coding process, which leads to a variety of category structures when fast learning is used. Test set prediction accuracy of the simulation that generated Table 7 was similar to that of Table 6, and each simulation had a 125-sample training set. However, the simulation of Table 7 produced only 4 $ART_a$ categories, only one of which (category 1) has the same long term memory representation as category 2 in Table 6. Note that, at this stage of coding, certain features are uninformative. For example, no values are specified for features 1, 2, 3, or 22 in Table 6 or Table 7; and feature 16 (veil-type) always has the value "partial." However, performance is still only around 96%. As rare instances from small categories later in the coding process, some of these features may become critical in identifying exemplars of small categories.

While the invention has been particularly shown and described with reference to a preferred embodiment thereof, it will be understood by those skilled in the art that various changes in form and details may be made therein without departing from the spirit and scope of the invention as defined by the appended claims. For example, with only two choices of poisonous or non-poisonous as the second-category-representation in the simulation, a full ART pattern recognition system $ART_b$ would not be required. In that simple case, $ART_a$ could be reset as described in response to a simple comparison. However, the use of the second pattern recognition system $ART_b$ allows for a much more complex comparison. Further, any of the ART systems may be utilized in the present invention, and the invention may even be applied to other neural network systems.

TABLE 2

22 Observable Features and their 126 Values

| Number | Feature | Possible Values |
|---|---|---|
| 1 | cap-shape | bell, conical, convex, flat, knobbed, sunken |
| 2 | cap-surface | fibrous, grooves, scaly, smooth |
| 3 | cap-color | brown, buff, gray, green, pink, purple, red, white, yellow, cinnamon |
| 4 | bruises | bruises, no bruises |
| 5 | odor | none, almond, anise, creosote, fishy, foul, musty, pungent, spicy |
| 6 | gill-attachment | attached, descending, free, notched |
| 7 | gill-spacing | close, crowded, distant |
| 8 | gill-size | broad, narrow |
| 9 | gill-color | brown, buff, orange, gray, green, pink, purple, red, white, yellow, chocolate, black |
| 10 | stalk-shape | enlarging, tapering |
| 11 | stalk-root | bulbous, club, cup, equal, rhizomorphs, rooted, missing |
| 12 | stalk-surface-above-ring | fibrous, silky, scaly, smooth |
| 13 | stalk-surface-below-ring | fibrous, silky, scaly, smooth |
| 14 | stalk-color-above-ring | brown, buff, orange, gray, pink, red, white, yellow, cinnamon |
| 15 | stalk-color-below-ring | brown, buff, orange, gray, pink, red, white, yellow, cinnamon |
| 16 | veil-type | partial, universal |
| 17 | veil-color | brown, orange, white, yellow |
| 18 | ring-number | none, one, two |
| 19 | ring-type | none, cobwebby, evanescent, flaring, large, pendant, sheathing, zone |
| 20 | spore-print-color | brown, buff, orange, green, purple, white, yellow, chocolate, black |
| 21 | population | abundant, clustered, numerous, scattered, several, solitary |
| 22 | habitat | grasses, leaves, meadows, paths, urban, waste, woods |

TABLE 3

On-Line Learning

Average number of correct predictions on previous 100 trials

| Trial | $\bar{\rho}_a = 0$ no replace | $\bar{\rho}_a = 0$ replace | $\bar{\rho}_a = 0.7$ no replace | $\bar{\rho}_a = 0.7$ replace |
|---|---|---|---|---|
| 100 | 82.9 | 81.9 | 66.4 | 67.3 |
| 200 | 89.8 | 89.6 | 87.8 | 87.4 |
| 300 | 94.9 | 92.6 | 94.1 | 93.2 |
| 400 | 95.7 | 95.9 | 96.8 | 95.8 |
| 500 | 97.8 | 97.1 | 97.5 | 97.8 |
| 600 | 98.4 | 98.2 | 98.1 | 98.2 |
| 700 | 97.7 | 97.9 | 98.1 | 99.0 |
| 800 | 98.1 | 97.7 | 99.0 | 99.0 |
| 900 | 98.3 | 98.6 | 99.2 | 99.0 |
| 1000 | 98.9 | 98.5 | 99.4 | 99.0 |
| 1100 | 98.7 | 98.9 | 99.2 | 99.7 |
| 1200 | 99.6 | 99.1 | 99.5 | 99.5 |
| 1300 | 99.3 | 98.8 | 99.8 | 99.8 |
| 1400 | 99.7 | 99.4 | 99.5 | 99.8 |
| 1500 | 99.5 | 99.0 | 99.7 | 99.6 |
| 1600 | 99.4 | 99.6 | 99.7 | 99.8 |
| 1700 | 98.9 | 99.3 | 99.8 | 99.8 |
| 1800 | 99.5 | 99.2 | 99.8 | 99.9 |
| 1900 | 99.8 | 99.9 | 99.9 | 99.9 |

TABLE 3-continued

On-Line Learning

Average number of correct predictions on previous 100 trials

| Trial | $\bar{p}_a = 0$ no replace | $\bar{p}_a = 0$ replace | $\bar{p}_a = 0.7$ no replace | $\bar{p}_a = 0.7$ replace |
|---|---|---|---|---|
| 2000 | 99.8 | 99.8 | 99.8 | 99.8 |

TABLE 4

Off-Line Forced-Choice Learning

| Training Set Size | Average % Correct (Test Set) | Average % Incorrect (Test Set) | Number of $ART_a$ Categories |
|---|---|---|---|
| 3 | 65.8 | 34.2 | 1–3 |
| 5 | 73.1 | 26.9 | 1–5 |
| 15 | 81.6 | 18.4 | 2–4 |
| 30 | 87.6 | 12.4 | 4–6 |
| 60 | 89.4 | 10.6 | 4–10 |
| 125 | 95.6 | 4.4 | 5–14 |
| 250 | 97.8 | 2.2 | 8–14 |
| 500 | 98.4 | 1.6 | 9–22 |
| 1000 | 99.8 | 0.2 | 7–18 |
| 2000 | 99.96 | 0.04 | 10–16 |
| 4000 | 100 | 0 | 11–22 |

TABLE 5

Off-Line Conservative Learning

| Training Set Size | Average % Correct (Test Set) | Average % Incorrect (Test Set) | Average % No-Response (Test Set) | Number of $ART_a$ Categories |
|---|---|---|---|---|
| 3 | 25.6 | 0.6 | 73.8 | 2–3 |
| 5 | 41.1 | 0.4 | 58.5 | 3–5 |
| 15 | 57.6 | 1.1 | 41.3 | 8–10 |
| 30 | 62.3 | 0.9 | 36.8 | 14–18 |
| 60 | 78.5 | 0.8 | 20.8 | 21–27 |
| 125 | 83.1 | 0.7 | 16.1 | 33–37 |
| 250 | 92.7 | 0.3 | 7.0 | 42–51 |
| 500 | 97.7 | 0.1 | 2.1 | 48–64 |
| 1000 | 99.4 | 0.04 | 0.5 | 53–66 |
| 2000 | 100.0 | 0.00 | 0.05 | 54–69 |
| 4000 | 100.0 | 0.00 | 0.02 | 61–73 |

TABLE 6

| # | Feature | 1 = P | 2 = E | 3 = E | 4 = E | 5 = P | 6 = E | 7 = P | 8 = P | 9 = E |
|---|---|---|---|---|---|---|---|---|---|---|
| 1 | cap-shape | | | | | | | | | |
| 2 | cap-surface | | | | | | | | | |
| 3 | cap-color | | | | | | | | | |
| 4 | bruises? | | | | | | | | yes | no | yes |
| 5 | odor | | none | | | | none | | | |
| 6 | gill-attachment | free | free | | free | free | free | free | free | free |
| 7 | gill-spacing | close | | | close | close | close | close | close | close |
| 8 | gill-size | | broad | | | | | | narrow | broad |
| 9 | gill-color | | | | | | | | buff | |
| 10 | stalk-shape | | | | | | | | tapering | enlarged |
| 11 | stalk-root | | | | | | | | missing | club |
| 12 | stalk-surface-above-ring | | | smooth | smooth | smooth | smooth | smooth | smooth | smooth |
| 13 | stalk-surface-below-ring | | | smooth | | | | | | smooth |
| 14 | stalk-color-above-ring | | | | | white | white | white | pink | white |
| 15 | stalk-color-below-ring | | | | | | white | | | white |
| 16 | veil-type | partial | partial | partial | partial | partial | partial | partial | partial | partial |
| 17 | veil-color | white | white | | white | white | white | white | white | white |
| 18 | ring-number | one | | one | one | | one | one | one | one |
| 19 | ring-type | | | pendant | | | | pendant | evanescent | pendant |
| 20 | spore-print-color | | | | | | | | white | |
| 21 | population | | | | | several | several | scattered | several | scattered |
| 22 | habitat | | | | | | | | | |
| | # coded/category: | 2367 | 1257 | 387 | 1889 | 756 | 373 | 292 | 427 | 251 |

TABLE 7

| # | Feature | 1 = E | 2 = P | 3 = P | 4 = E |
|---|---|---|---|---|---|
| 1 | cap-shape | | | | |
| 2 | cap-surface | | | | |
| 3 | cap-color | | | | |
| 4 | bruises? | | | no | |
| 5 | odor | none | | | |
| 6 | gill-attachment | free | free | | |
| 7 | gill-spacing | | | close | close |
| 8 | gill-size | broad | | | broad |
| 9 | gill-color | | | | |
| 10 | stalk-shape | | | | enlarging |
| 11 | stalk-root | | | | |
| 12 | stalk-surface-above-ring | | | | smooth |
| 13 | stalk-surface-below-ring | | | | |
| 14 | stalk-color-above-ring | | | | |
| 15 | stalk-color-below-ring | | white | | |
| 16 | veil-type | partial | partial | partial | partial |
| 17 | veil-color | white | white | white | |
| 18 | ring-number | | one | | one |
| 19 | ring-type | | | | pendant |
| 20 | spore-print-color | | | | |
| 21 | population | | | | |
| 22 | habitat | | | | |
| | # coded/category: | 3099 | 1820 | 2197 | 883 |

REFERENCES

[1] Carpenter, G. A. and Grossberg, S. (1988). The ART of adaptive pattern recognition by a self-organizing neural network. *Computer*, 21, 77–88.

[2] Grossberg, S. (1988a). Nonlinear neural networks: Principles, mechanisms, and architectures. *Neural Networks*, 1, 17–61.

[3] Grossberg, S. (1976a). Adaptive pattern classification and universal recoding, I: Parallel development and coding of neural feature detectors. *Biological Cybernetics*, 23, 121–134.

[4] Grossberg, S. (1976b). Adaptive pattern classification and universal recoding, II: Feedback, expectation, olfaction, and illusions. *Biological Cybernetics*, 23, 187–202.

[5] Grossberg, S. (1982). Studies of mind and brain: Neural principles of learning, perception, development, cognition, and motor control. Boston: Reidel Press.

[6] Grossberg, S. (Ed.) (1987a). The adaptive brain, I: Cognition, learning, reinforcement, and rhythm. Amsterdam: Elsevier/North-Holland.

[7] Grossberg, S. (Ed.) (1987b). The adaptive brain, II: Vision, speech, language, and motor control. Amsterdam: Elsevier/North-Holland.

[8] Grossberg, S. (Ed.) (1988b). Neural networks and natural intelligence. Cambridge, Mass.: MIT Press.

[9] Carpenter, G. A. and Grossberg, S. (1987a). A massively parallel architecture for a self-organizing neural pattern recognition machine. *Computer Vision, Graphics and Image Processing*, 37, 54–115.

[10] Carpenter, G. A. and Grossberg, S. (1987b). ART 2: Stable self-organization of pattern recognition codes for analog input patterns. *Applied Optics*, 26, 4919–4930.

[11] Carpenter, G. A., and Grossberg, S. (1990). ART 3: Hierarchical search using chemical transmitters in self-organizing pattern recognition architectures. *Neural Networks*, 3, 129–152.

[12] Carpenter, G. A. (1989). Neural network models for pattern recognition and associative memory. *Neural Networks*, 2, 243–257.

[13] Parker. D. B. (1982). Learning-logic. Invention Report S81-64, File 1, Office of Technology Licensing, Stanford University.

[14] Rumelhart, D. E. and McClelland, J. L. (Eds.), (1986). Parallel distributed processing, Volume 1. Cambridge, Mass.: MIT Press.

[15] Werbos, P. (1974). Beyond regression: New tools for prediction and analysis in the behavioral sciences. Cambridge, Mass.: Harvard University.

[16] Werbos, P. (1982). Applications of advances in nonlinear sensitivity analysis. In A. V. Balakrishnan, M. Thoma, R. F. Drenick, and F. Kozin (Eds.), Lecture notes in control and information sciences, Volume 38: System modeling and optimization. New York: Springer-Verlag.

[17] Searle, J. R. (1983). Intentionality, an essay in the philosophy of mind. Cambridge: Cambridge University Press.

[18] Schlimmer, J. S. (1987a). Mushroom database. UCI Repository of Machine Learning Databases. (aha@ics.uci.edu)

[19] Lincoff, G. H. (1981). The Audobon Society field guide to North American mushrooms. New York: Alfred A. Knopf.

[20] Schlimmer, J. S. (1987b). Concept acquisition through representational adjustment (Technical Report 87-19). Doctoral dissertation, Department of Information and Computer Science, University of California at Irvine.

[21] Iba, W., Wogulis, J., and Langley, P. (1988). Trading off simplicity and coverage in incremental concept learning. In Proceedings of the 5th international conference on machine learning. Ann Arbor, Mich.: Morgan Kaufmann, 73–79.

22] Kendall, M. G. and Stuart, A. (1966). The advanced theory of statistics, Volume 3. New York: Haffner, Chapter 43.

[23] Grossberg, S. (1969). On learning and energy-entropy dependence in recurrent and nonrecurrent signed networks. *Journal of Statistical Physics*, 1, 319–350.

[24] Grossberg, S. (1982). Processing of expected and unexpected events during conditioning and attention: A psychophysiological theory. *Psychological Review*, 89, 529–572.

[25] Grossberg, S. (1984). Some psychophysiological and pharmacological correlates of a developmental, cognitive, and motivational theory. In R. Karrer, J. Cohen, and P. Tueting (Eds.), Brain and information: Event related potentials. New York: N.Y. Academy of Sciences, 58–151.

[26] Bullock, D. and Grossberg, S. (1988). Neural dynamics of planned arm movements: Emergent invariants and speed-accuracy properties during trajectory formation. *Psychological Review*, 95, 49–90.

We claim:

1. A pattern recognition system comprising:
   an A pattern recognition subsystem for searching, selecting and learning an A-category-representation in response to an A input pattern;
   means for predicting a B-category-representation from a selected A-category-representation;
   means for providing a control B-category-representation;
   means for detecting a mismatch between a predicted B-category-representation and a control B-category representation; and
   means responsive to a mismatch between a predicted B-category-representation and a control B-category-representation to cause selection of a new A-category-representation.

2. A system as claimed in claim 1 wherein the A pattern recognition subsystem comprises:
   a feature representation field of nodes for receiving input signals, defining an A input pattern, and template signals;
   means for selecting an A-category-representation in an A-category-representation field of nodes based on a pattern from the feature representation field;
   means for generating the template signals based on the selected A-category-representation;
   means for adapting A-category-representation selection and the template signals to the input signals; and
   first reset means for resetting A-category-representation selection with an insufficient match between the input pattern and the template signal.

3. A system as claimed in claim 2 further comprising a B pattern recognition subsystem for providing the control B-category-representation from a B input pattern.

4. A system as claimed in claim 1 wherein the A pattern recognition subsystem resets A-category-representation selection with an insufficient match within the A pattern recognition subsystem between the A-category-representation and the A-input pattern with a first level of matching vigilance, and the means responsive to a mismatch between a predicted B-category-representation and a control B-category representation increases the matching vigilance within the A pattern recognition subsystem to cause reset of the A-category-representation selection, increased vigilance being maintained with subsequent search for and selection of an A-category-representation and matching of a selected A-category-representation to said A input pattern.

5. A system as claimed in claim 4 wherein vigilance is increased to a minimum level required to reset the A-category-representation.

6. A system as claimed in claim 1 wherein the means for predicting comprises a mapping field of nodes having a one-to-one correspondence between nodes of a B-category-representation field and nodes of the mapping field and adaptive mapping from nodes of the A-category-representation field to nodes of the mapping field.

7. A system as claimed in claim 1 wherein the input pattern comprises a vector of feature representations and complements of the feature representations.

8. A system as claimed in claim 1 further comprising: a B pattern recognition subsystem for selecting the control B-category-representation in response to a B input pattern and for learning the B-category-representation as a response to the B input pattern.

9. A system as claimed in claim 8 wherein the B-category-representation selected by the B pattern recognition subsystem is learned by the means for predicting as a predicted B-category-representation associated with a selected A-category-representation.

10. A system as claimed in claim 8 wherein the predicted B category representation associated with a selected A-category-representation primes the B pattern recognition subsystem to initially select the predicted B-category-representation as the B-category-representation.

11. A system as claimed in claim 8 wherein the a pattern recognition subsystem resets A-category-representation selection with an insufficient match within the A pattern recognition subsystem between the A-category-representation and the A-input pattern with a first level of matching vigilance, and the means responsive to a mismatch between a predicted B-category-representation and a control B-category representation increases the matching vigilance within the A pattern recognition subsystem to cause reset of the A-category-representation selection, increased vigilance being maintained with subsequent search for and selection of an A-category-representation and matching of a selected A-category-representation to said A input pattern.

12. A system as claimed in claim 11 wherein the A pattern recognition subsystem comprises:
a feature representation field of nodes for receiving input signals, defining an A input pattern, and template signals;
means for selecting an A-category-representation in an A-category-representation field of nodes based on a pattern from the feature representation field;
means for generating the template signals based on the selected A-category-representation;
means for adapting A-category-representation selection and the template signals to the input signals; and
first reset means for resetting A-category-representation selection with an insufficient match between the input pattern and the template signals.

13. A pattern recognition system comprising:
A. an A pattern recognition subsystem comprising:
an A feature representation field of nodes for receiving A input signals, defining an A input pattern, and A template signals;
means for selecting an A-category-representation in an A-category-representation field of nodes based on a pattern from the feature representation field;
means for generating the A template signals based on the selected A-category-representation;
means for adapting A-category-representation selection and the A template signals to the A input signals; and
A reset means for resetting A-category-representation selection with an insufficient match between the A input pattern and the A template signals at a first level of matching vigilance;

B. a B pattern recognition subsystem comprising:
a B feature representation field of nodes for receiving B input signals, defining a B input pattern, and B template signals;
means for selecting a B-category-representation in a B-category-representation field of nodes based on a pattern from the B feature representation field;
means for generating the B template signals based on the selected B-category-representation;
means for adapting B-category-representation selection with an insufficient match between the B input pattern and the B template signals;

C. means for associating the selected A-category-representation with a predicted B-category-representation comprising a mapping field of nodes having a one-to-one correspondence with nodes of the B-category-representation field and adaptive mapping from nodes in the A-category-representation field, the predicated B-category-representation associated with a selected first-category-representation being learned as the B-category-representation selected by the B pattern recognition subsystem; and D. system reset means for resetting an A-category-representation selection in the A pattern recognition subsystem where a predicted B-category-representation associated with the selected A-category-representation fails to match a B-category-representation selected by the B pattern recognition subsystem, the system reset means increasing vigilance of the A reset means to cause reset of the A-category-representation selection, increased vigilance being maintained with subsequent selection of an A-category-representation with said A input signals applied to the A feature representation field.

14. A system as claimed in claim 13 wherein the predicted B-category-representation associated with a selected A-category-representation primes the B pattern recognition subsystem to initially select the predicted B-category-representation.

15. A system as claimed in claim 14 wherein the input signals to each pattern recognition subsystem comprise a vector of feature representations and complements of the feature representations.

16. A pattern recognition method comprising:
searching, selecting and learning an A-category-representation in response to an A input pattern;
predicting a B-category-representation from a selected A-category-representation;
providing a control B-category-representation;
detecting a mismatch between the predicted B-category-representation and the control B-category-representation; and
selecting a new A-category-representation when a mismatch between the predicted B-category-representation and the control B-category-representation is detected.

17. A method as claimed in claim 16 further comprising:
based on an A input pattern, selecting an A-category-representation;
generating A template signals based on the selected A-category-representation;
adapting A-category-representation selection and the A template signals to the A input signals with a sufficient match between the A input pattern and the A template signal; and resetting A-category-representation selection with an insufficient match between the A input pattern and the A template signal.

18. A method as claimed in claim 17 further comprising providing the control B-category-representation from a B input pattern.

19. A method as claimed in claim 16 wherein the A-category-representation selection is reset with a first level of matching vigilance with an insufficient match between the A input pattern and the A-category-representation and, where a predicted B-category-representation associated with a selected A-category-representation fails to match a control B-category-representation, the matching vigilance is increased to cause reset of the A-category-representation selection, increased vigilance being maintained with subsequent selection of an A-category-representation and matching of a selected A-category-representation to said A input pattern.

20. A method as claimed in claim 19 wherein vigilance is increased to a minimum level required to reset the A-category-representation.

21. A method as claimed in claim 16 further comprising mapping between control B-category-representation to A-category-representations through a one-to-one mapping of control B-category-representations to predicted B-category-representations and adaptive mapping of A-category-representations to predicted B-category-representations.

22. A method as claimed in claim 16 further comprising providing as the input pattern a vector of feature representations and complements of the feature representations.

23. A method as claimed in claim 16 further comprising:
selecting the control B-category-representation in response to a B input pattern and learning the B-category-representation as a response to the second input pattern.

24. A method is claimed in claim 23 further comprising learning the selected B-category-representation as a predicted B-category-representation associated with a selected A-category-representation.

25. A method is claimed in claim 23 further comprising initially selecting the predicted B-category-representation as the B-category-representation.

26. The method as claimed in claim 23 wherein the A-category-representation selection is reset with a first level of matching vigilance with an insufficient match between the A input pattern and the A-category-representation and, where a predicted B-category-representation associated with a selected A-category-representation fails to match a control B-category-representation, the matching vigilance is increased to cause reset of the A-category-representation selection, increased vigilance being maintained with subsequent selection of an A-category-representation and matching of a selected A-category-representation to said A input patterns.

* * * * *

UNITED STATES PATENT AND TRADEMARK OFFICE
CERTIFICATE OF CORRECTION

PATENT NO. : 5,214,715

DATED : May 25, 1993

INVENTOR(S) : Gail A. Carpenter, Stephen Grossberg and John H. Reynolds

It is certified that error appears in the above-identified patent and that said Letters Patent is hereby corrected as shown below:

On the title page:
In section [75], Inventors, change "John W. Reynolds" to
---John H. Reynolds---.

In Claim 1, column 34, line 19, insert a hyphen between "category" and "representation" and line 22 at the end should read "selection of a new A-".

In Claim 4, column 34, line 51, insert a hyphen between "category" and "representation".

In Claim 10, column 35, line 15, change "B category representation" to ---B-category-representation---.

In Claim 11, column 35, line 20, change "a" to ---A--- and in line 27, change "B-category representation" to ---B-category-representation---.

In Claim 24, column 38, line 11, change "is" to ---as---.

In Claim 25, column 38, line 15, change "is" to ---as---.

Signed and Sealed this

Seventeenth Day of May, 1994

*Attest:*

BRUCE LEHMAN

*Attesting Officer*            *Commissioner of Patents and Trademarks*

UNITED STATES PATENT AND TRADEMARK OFFICE
CERTIFICATE OF CORRECTION

PATENT NO. : 5,214,715
DATED : May 25, 1993
INVENTOR(S) : Gail A. Carpenter, Stephen Grossberg and John H. Reynolds It is certified that error appears in the above-identified patent and that said Letters Patent is hereby corrected as shown below:

In column 1, line 13, after "K00880)," insert --and the Department of the Navy, Grant N00014-91-J-4100--.

Signed and Sealed this

Seventh Day of January, 1997

Attest:

BRUCE LEHMAN

Attesting Officer   Commissioner of Patents and Trademarks